United States Patent
Frankel et al.

(10) Patent No.: US 6,324,437 B1
(45) Date of Patent: Nov. 27, 2001

(54) SYSTEM AND METHOD FOR MANAGING THE ALTERATION OF GARMENTS

(75) Inventors: Charles Frankel; Fang Zhong Ding, both of Chicago, IL (US); Timothy J. Findlow, Boort (AU); Robert M. Millman, Chicago, IL (US)

(73) Assignee: New Century Information Services, Inc., Chicago, IL (US)

( * ) Notice: Subject to any disclaimer, the term of this patent is extended or adjusted under 35 U.S.C. 154(b) by 0 days.

(21) Appl. No.: 09/470,437

(22) Filed: Dec. 22, 1999

Related U.S. Application Data

(62) Division of application No. 08/766,768, filed on Dec. 12, 1996, now Pat. No. 6,151,531.

(51) Int. Cl.⁷ .................................................... G06F 17/00
(52) U.S. Cl. ........................... 700/90; 700/100; 700/111; 700/113; 700/132; 700/166; 700/255; 705/1; 705/7; 705/16; 705/24; 705/26; 705/27; 705/30; 705/32; 33/11; 706/53
(58) Field of Search ............................ 700/90, 100, 132, 700/111, 130, 113, 225, 166; 33/111; 705/1, 7, 32, 16, 24, 27, 26, 30; 706/26, 904, 53; 434/350; 370/413

(56) References Cited

U.S. PATENT DOCUMENTS

| | | |
|---|---|---|
| 3,938,106 | 2/1976 | Becker . |
| 4,149,246 | 4/1979 | Goldman . |
| 4,408,291 | 10/1983 | Gunzberg et al. . |
| 4,509,123 | 4/1985 | Vereen . |
| 4,561,060 | 12/1985 | Hemond . |
| 4,598,376 * | 7/1986 | Burton et al. .......................... 700/132 |
| 4,682,261 | 7/1987 | Benson et al. . |
| 4,803,348 | 2/1989 | Lohrey et al. . |
| 4,916,624 * | 4/1990 | Collins et al. ........................ 700/132 |
| 4,916,634 * | 4/1990 | Collins et al. .......................... 706/62 |
| 4,926,344 | 5/1990 | Collins et al. . |
| 5,125,034 | 6/1992 | Hudson et al. . |
| 5,163,007 | 11/1992 | Slilaty . |
| 5,176,520 | 1/1993 | Hamilton . |
| 5,233,534 | 8/1993 | Osthus et al. . |
| 5,347,477 | 9/1994 | Lee . |
| 5,619,799 * | 4/1997 | Keung-Lung et al. ................... 33/11 |
| 5,681,482 | 10/1997 | Reber . |
| 5,724,357 | 3/1998 | Derks . |
| 5,930,769 * | 7/1999 | Rose ...................................... 705/27 |

* cited by examiner

*Primary Examiner*—Mark A. Cuchlinski, Jr.
*Assistant Examiner*—McDieunel Marc
(74) *Attorney, Agent, or Firm*—Brinks Hofer Gilson & Lione

(57) ABSTRACT

A system and method for managing garment alterations. The system includes a workroom processor having a display and operating a garment alteration application system. Alterations tickets are created using a garment alterations ticket terminal, or display interfaces on the workroom processor that prompt the user for garment alteration data. The alteration data is stored in an alteration ticket data structure that relates to the workflow of a typical workroom. Alterations tickets are presented in the ticket list from which the alteration ticket status updated according to work performed. The reports module generates corporate and workroom management reports based on data stored in relation to the alterations.

29 Claims, 37 Drawing Sheets

Fig. 5A

Alteration Ticket Data Structure Hierarchy

| Fields | Levels |
|---|---|
| Sales Receipt ---> | n number of sales receipts |
| Ticket ---> | n number of tickets per sales receipt |
| Garment ---> | up to 4 garments or tags per ticket |
| Fitting ---> | up to 9 fittings per garment |
| Alteration ---> | n number of alterations per fitting |

*Fig*. 5B

Ticket Data

- workroom identifier
- ticket identifier
- customer identifier
- sales information
  - sales receipt identifier
  - sales associate
  - sales event
  - the date of the sale
  - amount collected
  - the method of payment
  - whether the amount collected was a partial or a full payment
  - whether the alteration fees were waived
  - who authorized the waiving
  - what reason was given for the waiving
  - total value of the alterations on the ticket
- where the garment was purchased
- the number of garments or tags
- status information
  - the earliest promise date of all of the garments on the ticket
  - the state of each of the garments (in-process, partially complete, complete, released or picked up, closed)
  - whether all of the garments are released
  - whether all of the garments are closed
- realteration information
  - the realteration count (what number realteration is the ticket)
  - the original ticket identifier
  - the original tag identifier
  - the original release date
  - the original fitter identifier
  - the original sewer identifier
  - the reason for the realteration
  - realteration notes
- the job identifier
- wedding information
  - wedding date
  - bridal party name

Fig. 5c

Garment Data

- workroom identifier
- ticket identifier
- tag identifier
- whether the garment will be picked up or sent to the customer
- physical garment information
  - type
  - color
  - size
- retailer-specific information
  - department identifier where garment was sold
  - vendor identifier who manufactured garment
  - fitter identifier
- alteration pricing selecting information
  - purchase type (current, recent, customer's own goods, etc.)
  - purchase pricing (regular pricing, sale pricing, premium pricing, no charge, etc.)
  - gender
  - work type (subset of gender)
- alteration value information
  - other charges associated with the garment
  - total sum of individual alteration values
- date information
  - purchase date
  - entry date
  - most recent promise date
  - most recent promise time
- alteration workload information
  - sum of individual alteration standard minutes
  - sum of standard minutes converted to standard units
- transfer information
  - whether the garment has been marked to be transferred during data entry
  - whether the garment has been transferred
  - the ticket identifier as a transferred ticket
- the tag identifier of the transferred garment
  - the workroom identifier of which workroom sent the garment
  - the workroom identifier of the workroom which is to receive the garment
  - the manifest number of the sending transfer object
  - the date/time the sending transfer object was created
  - the date/time the sending transfer object was sent from the originating store
  - the date/time the garment data was imported at the receiving store
  - the manifest number of the returning transfer object
  - the date/time the returning transfer object was created
  - the date/time the garment data was imported back at the sending store
- the date/time the object was updated with information from the store with garment
  - status information
    - number of alterations
    - number of alterations that have been completed
    - the transfer state of the garment (send pending, out, received, imported, return pending, return sent, return received)
    - completion date & to where was the garment released
    - pick up date & who picked up the garment

*Fig.* 5D

Fitting Data

- workroom identifier
- ticket identifier
- tag identifier
- fitting identifier
- fitting date
- fitter identifier
- promise date
- promise time

⟵ 95

Alteration Data

- workroom identifier
- ticket identifier
- tag identifier
- fitting identifier
- alteration (verb part of the alteration)
- item (noun part of the alteration)
- quantity
- sewer identifier of person who completed the alteration
- completion date of the alteration
- workroom identifier of workroom where alteration was completed
- unit minutes to complete the alteration
- unit standard units to complete the alteration
- unit price or value of the alteration
- price type (see below)
- alteration group

⟵ 96

Alteration price list

- gender
- work type
- garment type
- alteration group
- alteration
- item
- unit minutes to complete the alteration
- unit standard units to complete the alteration
- price type
- general pricing order
- short list pricing order

| Code | Quantity | Unit Minutes | Unit Price | Total Minutes Equals | Total Price Calculated By: | Comments |
|---|---|---|---|---|---|---|
| 0 | X | | | quantity times unit minutes | quantity x unit price | |
| 1 | 1 | X | $ | entered as minutes | Price as services per hour: unit minutes times ($ divided by 60 minutes) | |
| 2 | 1 | | X | unit minutes from price list | either unit price from price list or as entered | |
| 3 | 1 | | | unit minutes from price list | unit price from price list | |
| 4 | 1 | X | X | either from price list or as entered | either unit price from price list or as entered | minutes and price independent |
| 5 | 1 | X | | either from price list or as entered | unit price from price list | |
| 6 | (X) | X | X | either unit price from price list or as entered | either unit price from price list or as entered | minutes and price independent |
| 7 | (X) | X | | either from price list or as entered | unit price from price list | |

1   Quantity always = 1
X   Means user can enter this value
    Blank means user cannot enter this field
(X)  Means can enter quantity but will not change minutes or price
$   Already entered hourly rate

Fig. 6

Day List Selector

Fig. 10A

| Create New Ticket - Look Up Customer | | | | |
|---|---|---|---|---|
| Customer Last Name | | | | |
| Jones | | Find | | |
| Jones, Amanda | (312) - | (312) - | 60626 | |
| Jones, Charles | ( ) - | (312) - | 60620 | |
| Jones, Charles | (312) 774-7722 | (312) - | | |
| Jones, Gladys | (312) - | (312) - | | |
| jones, helen hart | (312) 427-5100 | (312) - | 60615 | |
| Jones, J | (312) 443-8354 | (312) - | 60478 | |
| Jones, Jerry | (773) 839-2099 | (773) 830-9983 | | |
| Jones, Jim | (312) 324-5643 | (312) - | | |
| Jones, Matte | (312) 874-8851 | (312) - | | |
| Jones, Meir D | (716) 684-6371 | (516) 466-8949 | 14086-0748 | |
| Jones, S | (312) - | (312) - | | |
| Jones, Sam | (312) 498-4878 | (312) - | | |
| Jones, Tammye | (312) - | (312) - | 60653 | |
| Jones, Timothy K | (312) 721-1714 | ( ) - | 60649-2613 | |
| Jones, William | ( ) - | (312) 631-1686 | | |

New | Use | Cancel | Help

Create New Ticket - Enter Ticket and Sales Information

| | | |
|---|---|---|
| Ticket Number: | 00 ▼ - 12345 | Fifth Avenue Store |
| Receipt Number: | 0000-9876 | |

| | This Ticket | This Receipt | |
|---|---|---|---|
| Amount Collected: | 12.00 | 12.00 | [Other Tickets] |
| Date Collected/Waived: | 12/02/99 | ☐ Partial Payment | |
| Charge: | ☑ Is Waived | | |
| Reason for Waiving: | Charge Dept For Alterations ▼ | | |
| Approved By: | Wardrobe Sale ▼ | | |
| Sales Associate: | Debby Hooks ▼ | | |
| Sales Event: | Annual Clearance ▼ | | |
| Job Number: | | | |
| Bridal Party: | | | |
| Wedding Date: | __/__/__ | | |

[<< Prev] [Create] [Cancel] [Help]

Realteration: Jones, Jim - Ticket 00-654321

New Ticket Number
00 ▼  909988   Fifth Avenue Store

Garment to be Realtered

| Tag | Garment | Color | Size | Dept | Vendor | Status |
|---|---|---|---|---|---|---|
| ☒ 1 | Trouser | Beige | 29L | 061 | 0 | Released |

Original Work

| Alteration | Completed By |
|---|---|
| Other Alterations - Seam | Berny K Heins |
| Press Trouser | Lynda K Fireside |
| Shorten Hem, Cuff Unfinished Bottom. | Lorie Dawley |
| Take In Waist and - or Seat and Crotcl | Lorie Dawley |

Original Sewer
Berny K Heins ▼

Reason for Realteration
Sewing Problem ▼

Realteration Notes

Enter notes for the realteration

[Create]  [Cancel]  [Help]

Capacity Forecast for Gender = Men and Work Type = Men

340

| Capacity | | | Workload | | | | | | | Hours Work Remaining: 0:00 | |
|---|---|---|---|---|---|---|---|---|---|---|---|
| Date | T | F | Total Hrs | Eff Hrs | Hrs Work | Forecast | Total Hrs | Open Hrs | % | | |
| 12/02/99 | 4 | 3 | 30:00 | 21:57 | 18:34 | 0:00 | 18:34 | 3:23 | 84 | | |
| 12/03/99 | 6 | 5 | 41:00 | 29:23 | 0:00 | 0:00 | 0:00 | 29:23 | 0 | | |
| 12/04/99 | 6 | 5 | 44:30 | 31:45 | 0:00 | 0:00 | 0:00 | 31:45 | 0 | | |
| 12/05/99 | 6 | 5 | 44:30 | 31:45 | 0:00 | 0:00 | 0:00 | 31:45 | 0 | | |
| 12/06/99 | 6 | 5 | 44:30 | 31:45 | 0:00 | 0:00 | 0:00 | 31:45 | 0 | | |
| 12/07/99 | 1 | 1 | 3:30 | 2:22 | 0:00 | 0:00 | 0:00 | 2:22 | 0 | | |
| 12/08/99 | 2 | 2 | 11:00 | 7:26 | 0:00 | 0:00 | 0:00 | 7:26 | 0 | | |
| 12/09/99 | 4 | 3 | 30:00 | 21:57 | 0:00 | 0:00 | 0:00 | 21:57 | 0 | | |
| 12/10/99 | 6 | 5 | 41:00 | 29:23 | 0:00 | 0:00 | 0:00 | 29:23 | 0 | | |
| 12/11/99 | 6 | 5 | 44:30 | 31:45 | 0:00 | 0:00 | 0:00 | 31:45 | 0 | | |
| 12/12/99 | 6 | 5 | 41:00 | 29:23 | 0:00 | 0:00 | 0:00 | 29:23 | 0 | | |
| 12/13/99 | 5 | 4 | 37:00 | 26:41 | 0:00 | 0:00 | 0:00 | 26:41 | 0 | | |
| 12/14/99 | 1 | 1 | 3:30 | 2:22 | 0:00 | 0:00 | 0:00 | 2:22 | 0 | | |

Create...    Cancel    Help

Workload Forecast for Gender = Men and Work Type = Men — 343

341

| Garment | 12/02/99 | 12/03/99 | 12/04/99 | 12/05/99 | 12/06/99 | 12/07/99 | 12/08/99 |
|---|---|---|---|---|---|---|---|
| 2 pc Suit | 5 | 5 | 5 | 5 | | | |
| 3 pc Suit | | | | | | | |
| Jean | | | | | | | |
| Leather | | | | | | | |
| Other | | | | | | | |
| Outerwear | | | | | | | |
| Shirt | | | | | | | |
| Sport Coat | | | | | | | |
| Eff Hrs | 21:57 | 29:23 | 31:45 | 31:45 | 31:45 | 2:22 | 7:2 |
| Actual | 18:34 | 0:00 | 0:00 | 0:00 | 0:00 | 0:00 | 0:0 |
| Forecast | 7:25 | 7:25 | 7:25 | 7:25 | 0 | 0 | 0 |
| % Capacity | 118 | 25 | 23 | 23 | | | |

Hours Work Remaining: 0.00

SYSTEM AND METHOD FOR MANAGING THE ALTERATION OF GARMENTS

This application is a division of application Ser. No. 08/766,768 filed Dec. 12, 1996, now U.S. Pat. No. 6,151,531.

A portion of the disclosure of this patent document contains material which is subject to copyright protection. The copyright owner has no objection to the facsimile reproduction by anyone of the patent documents or the patent disclosure, as it appears in the Patent and Trademark Office patent file or records, but otherwise reserves all copyright rights whatsoever.

MICROFICHE APPENDIX

A Microfiche Appendix of the presently preferred source code is attached and comprises 37 sheets having a total of 3550 frames.

FIELD OF THE INVENTION

This invention relates to the field of information management systems, and more particularly, to a computer system for the management of the alteration of garments.

BACKGROUND OF THE INVENTION

Garments sold at retail clothing stores must often be altered to fit the customer. Many retailers typically offer to perform the alterations necessary to fit a garment to a customer's size and dimension when a garment is purchased.

Garment alterations are performed in alterations workrooms. Clothing retailers typically operate alterations workrooms on store premises. The alterations workroom may be located near gender-specific clothing departments and special purpose clothing departments (e.g., bridal department). Alternatively, alterations workrooms may be centrally located to accommodate all clothing departments in a particular store. A majority of alterations performed at clothing stores result from purchases by customers of the clothing store. Another possible configuration places a larger, central workroom off-site that can serve more than one store located within a given geographical area. Many clothing stores also provide alterations as a service for people who bring in their own garments.

Customers may also take the garments to be altered at tailor shops that specialize in garment alterations. Independent tailor shops provide a service for individuals who bring in their own clothing, but may also provide a service as an overflow resource for clothing stores or other tailor shops that periodically lack the capacity to perform the present workload in their alteration workrooms. Independent tailor shops often operate as chains of several tailor shops. Tailor shops may also range in size from a single alterations workroom to several workrooms.

The garment alterations process in tailor shops and in retail stores is similar. As the following description of the process illustrates, tailor shops and retailers face similar problems.

During the garment selling process, the customer tries the garment on to decide whether or not to purchase the garment. When the customer decides to purchase the garment, a fitter determines how the garment is to be altered to fit the customer. The fitter records fitting data on a paper alterations ticket and marks the garment according to the alterations to be performed.

The fitting data includes customer information, sales information, garment information and alterations to be performed.

Once a fitter has recorded the fitting data necessary for each garment purchased, the garments are transferred to the alterations workroom. Garment transfer to the alterations workroom may occur at the end of the day, when all of the garments sold during the day are transferred together.

Alterations workrooms are typically organized according to basic steps in the alterations process. A typical alterations workroom includes an incoming garment rack, a waiting rack, at least one work space, an inspection rack and a completed rack. At some time after the garments are purchased and fitted, they are moved to the incoming garment rack in the alterations workroom.

Typically, when garments are placed on the incoming garment rack, a worker responsible for incoming garments examines each garment and the accompanying alteration ticket. Garments are prioritized in relation to other garments and may be placed on racks in an order that indicates the priority. Garment priority is based on a promised completion date.

The alterations are performed by sewers who work at one or more work spaces. As sewers complete alteration tasks, they return to the waiting rack for new alteration tasks to perform. Workers obtain the garments off the waiting rack and perform the alterations at their work spaces. Once alteration tasks are completed, the sewer places the garment on the inspection rack. Typically, a worker responsible for inspections retrieves the garment off the inspection rack to inspect the quality of the work and to compare the work done with the work noted on the alterations ticket. If the garment passes inspection, the garment is designated as complete.

Garments that have been completed are then placed on the completed rack. The garments remain in the workroom, typically organized by alphabetical order with respect to the customer's name. The completed garments may also be sent back to the department that sold the garment or to a central will-call area. The customer picks up the garment, or receives the garment if the store agreed to deliver the completed garment to the customers.

As the foregoing illustrates, the garment alterations process is by nature, a labor-intensive operation. Sewers use sewing machines, but the entire process is an inherently manual one that requires varying levels of skill. The process of tracking the work is also manual and dependent upon the use of manually generated sheets and reports.

Alteration shops are commonly viewed by retailers as cost centers, or as part of the business overhead. Because customers view charges for alterations as an added cost for the garment, retailers have little to promote in the way of alterations other than low alterations charges. Retailers are thus under great pressure to keep the cost of alterations at a minimum.

The pressure to keep alterations costs down makes the alterations process sensitive to costs incurred by inefficiencies and quality problems. With existing systems, little can be done to recoup costs resulting from inefficiencies and problems in quality. Moreover, alterations tend to provide an opportunity for new problems to arise in the sales process. If not done well, if the merchandise is lost, or if not performed in a timely manner, alterations can provide one more thing about which a customer can complain. Many stores also offer the alteration service for free, or even below-cost, leaving little room for a return on a costly payroll investment.

The management of alterations shops is often difficult for retailers. Many store managers, who likely have backgrounds in sales, do not really understand what happens in alterations shops. Moreover, information regarding the productivity of the alterations workers is either poorly documented, untimely or not available at all. The lack of information leads to guessing in making important strategic decisions such as how to price alterations, whether to increase or decrease labor resources and whether to centralize operations between stores. Lack of information is a problem from which even knowledgeable managers of tailor shops are not immune.

Sales associates lack incentive to accurately collect correct alterations fees. To secure a sale, the alteration fees may be reduced or eliminated for a customer by the sales associate. Also to secure a sale, the promise date for altered garment may be set artificially early. Without access to this information, managers, alteration workrooms can not manage costs and revenue to budget. The problems with alterations ultimately lead to lost future sales income based on customer dissatisfaction.

Alterations are nevertheless, a necessary industry service required to achieve sales. Properly managed, the cost of alterations operations may be reduced, productivity may increase and lost income may be recovered.

Presently, systems exist to aid alteration shop managers in measuring shop performance. These systems primarily offer a service in which processed alterations tickets collected over statistically significant periods of time are gathered and delivered to a central office. The central office analyzes the tickets using some data processing system.

The paper alterations tickets contain specific data such as the work that was ordered, the name of the person who performed the work, the price paid and various other items of information that enable the data processing system to determine factors such as workroom efficiency or even worker efficiency. The data processing system then sends a report to the operator or manager of the alteration shop detailing the workers' and workroom's performance along with evaluations based on a variety of performance factors.

The above approach suffers from long lag times between the time the work is done and the time the report is received. Typically, reports cover a time period of about a month. Any less of a time period would diminish the significance of the results. Any more of a time period would only extend the time lag to receive the reports.

Another problem with the central data processing approach is in the inherent inaccuracies that are often present in the alterations tickets. When a fitter or an alterations workroom gets busy, mistakes may be made in documenting alterations tickets. In a rush, the alteration ticket information may be recorded in an unreadable manner. One common inaccuracy occurs when the number of alterations performed does not match the number of alterations requested. Other types of inaccuracies may not even be evident from the alteration tickets. If the ticket is illegible, or erroneously prepared, the central data processing system typically makes assumptions about the work. The central data processing system is then left with an inaccurate or incomplete collection of data from which only inaccurate or incomplete performance ratings may be derived.

The processing of the paper ticket data may take six to twelve weeks to complete. By the time the operator of an alteration shop receives performance measurements, as many as three or four months may have elapsed since the work was performed. Problems that could have been solved with timely performance information have likely re-occurred many times over. Moreover, problems may become difficult or impossible to solve after a long period of occurrence. Inefficiencies that could have been eliminated with timely information likely resulted in increased shop costs over that time.

Other systems have attempted to cut into the time lag described above. In one approach, the central data processing system is sold to alteration shop chains or department stores and used to analyze workroom performance within the chain. The central office is a part of the same organization as the alterations workroom. Having the central office within the same organization makes uniform ticket handling procedures possible. This approach, however, has met with limited success. The system is nevertheless the same with regard to the time lag in obtaining results.

It would be desirable for a system to receive alterations data in real time or at least in time for a workroom manager to take action on it in a short period of time. It is further desirable to know the workload against available labor before work is sent into the process, so that alterations tasks may be better planned.

SUMMARY OF THE INVENTION

In view of the above, the present invention is directed to a system and method for managing the alteration of standard garments. The term standard garments as used herein refers to garments which have been produced in quantities and in standard sizes for purchase by customers, in contradistinction to custom garments which have been sewn to a custom fit for a customer. The system includes a workroom processor comprising an input, a data storage and a display. An alteration ticket data structure is stored in the data storage and defines a sales receipt data field, a ticket data field, a garment data field, a fitting data field and an alterations data field. The system includes means coupled to the input for prompting a user for garment data, alteration data, sales receipt data, fitting data and ticket data for a garment, and means for storing the data in corresponding fields in the alterations ticket data structure.

The system includes means coupled to the data storage for generating an alteration ticket corresponding to an entry in the alteration ticket data structure. The entry includes the sales receipt data, the ticket data, the garment data, and the alteration data. Means coupled to the display present the entry on the display, and means coupled to the input prompt the user to update the garment data and alteration data of the entry, and present the updated garment and alteration data on the display.

In another aspect of the present invention, a garment alteration ticket terminal includes a memory, an input and a display. An alteration ticket data structure is stored in the data storage and defines a sales receipt data field, a ticket data field, a garment data field, a fitting data field and an alterations data field. Means coupled to the input prompt a user for garment data, alteration data, sales receipt data, fitting data and ticket data for a garment. The data is stored in corresponding fields as an entry in the alteration ticket data structure. Means coupled to the input prompt a user for data relating to the request and for storing the data in the alteration ticket data structure.

Means coupled to the memory generate an electronic alteration ticket corresponding to an entry in the alteration ticket data structure. The entry includes the sales receipt data, the ticket data, the garment data and the alteration data. The garment alteration ticket terminal also includes means for periodically communicating the electronic alteration tickets stored in the memory via a communications interface.

According to another aspect of the present invention, a method is provided for managing the alteration of garments. The method includes a step of prompting a user for garment alterations data in response to a user input. The garment and alteration data is stored in an alteration ticket data structure. The alteration ticket data structure defines a ticket identifier field, a garment data field, an alterations data field and a ticket status field. An electronic alteration ticket is generated to correspond to an entry in the alteration ticket data structure. The entry includes the sales receipt data, the ticket data, the garment data, and the alteration data. The user is prompted, in response to the user input, to update the garment field and alteration field of the entry. The updated status is presented on the display.

The invention thus provides the user with a system that maintains information regarding garment alterations in a useful alterations ticket data structure. The alterations ticket data structure is organized in a manner that allows a user to input garment alterations data and update the status of the work being performed on the garment and keep track of the garment in the process. The alterations ticket data structure simplifies the display of information relating to each alteration ticket created. The alterations ticket data structure also simplifies the process of obtaining information on the alterations workroom. Information is available to forecast workload against labor resources, and to perform management tasks relating to assessing the workroom performance and quality as well as relating to making daily management decisions that affect the success of the workroom. The information provided is updated in real-time so that it remains current. The workroom manager thus analyzes data that is up to date rather than several months old. Data, aggregated across workrooms by the system, allows more senior managers to analyze relative performance and to analyze costs by departments and/or vendors, as well as, to make more accurate budgets.

These and other advantages will be apparent on consideration of the following detailed description of the preferred embodiments of the invention, taken in conjunction with the appended drawings.

BRIEF DESCRIPTION OF THE DRAWINGS

FIGS. 5A–5E depict the alteration ticket data structure hierarchy;

FIG. 6 depicts the display interface of the ticket list for the tickets module in FIG. 3;

FIGS. 10A–10H are examples of display interfaces used in the alterations ticket creation process of FIG. 9;

FIGS. 12A And 12B is an example of a display interface for the preferred garment transfer process of FIG. 11;

FIGS. 14A–14B are examples of display interfaces used in the alterations status update process of FIG. 12;

FIGS. 17A–17C are examples of display interfaces for the forecast function;

FIGS. 19A–19C are examples of screen interfaces for generating reports; and

DETAILED DESCRIPTION OF THE PRESENTLY PREFERRED EMBODIMENTS

Preferred embodiments will now be described with reference to the drawings where like numerals refer to like parts throughout.

I. System Configuration

Figure 1:
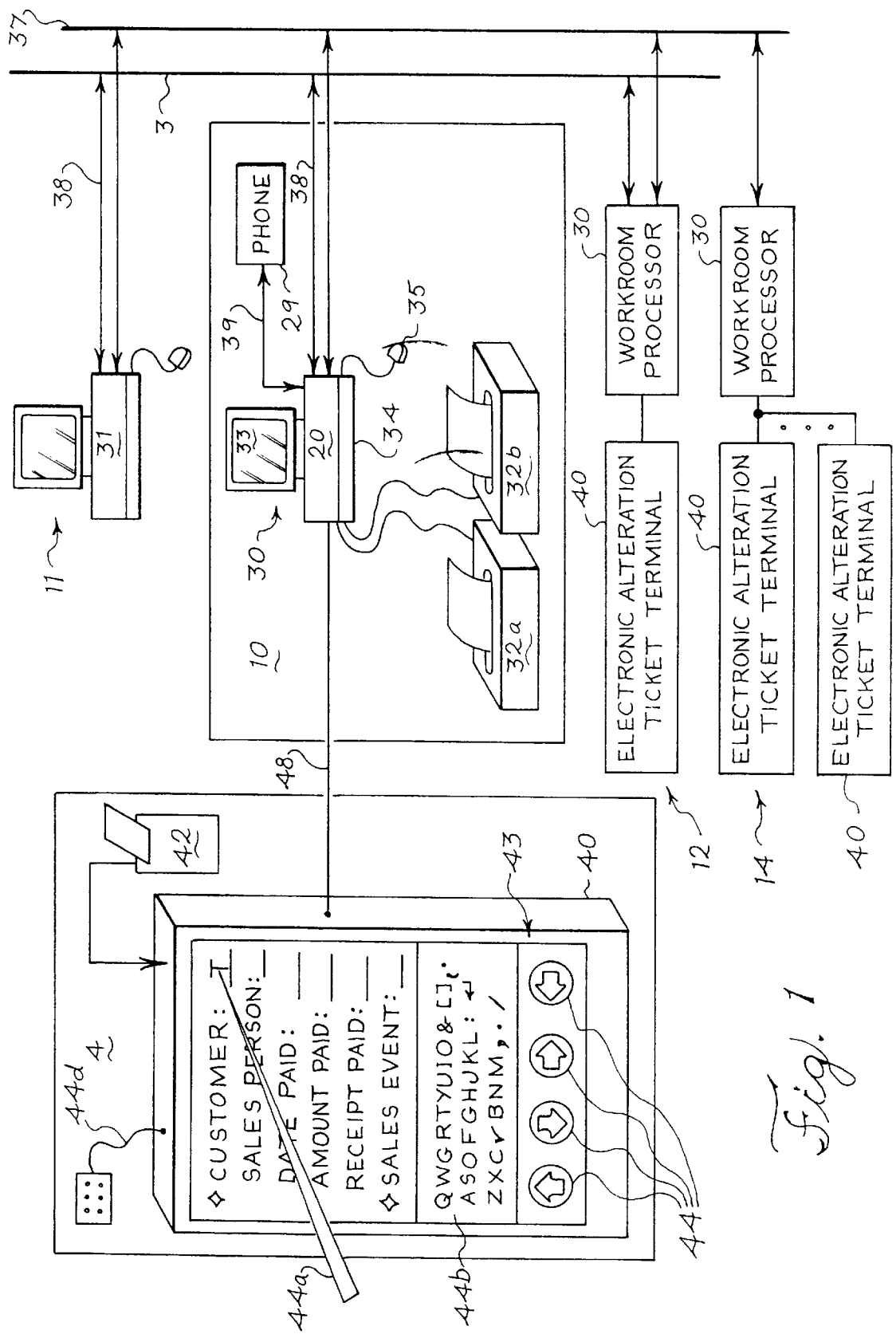
FIG. 1 depicts a preferred garment alterations management system.

Referring to FIG. 1, a garment alteration management system is provided to manage an alterations workload in and across workrooms, track garments alterations and provide management information in real-time. The system provides a set of tools that may be located in strategic locations to make data input uniform and easy.

A garment alteration management system includes a workroom processor 30, a central computer 31 and an electronic alterations ticket terminal 40. Each system component is intended to operate in the primary work areas of the garment alterations process. For example, the central computer 11 operates in a management office 11 where business decisions affecting the alterations process are made. The workroom processor 30 operates in an alterations workroom 10. The electronic alterations ticket terminal a operates in fitting areas 4 or in the alterations workroom 10.

The workroom processor 30 may operate as a standalone system for managing alterations in the workroom 10. Alternatively, a plurality of workroom processors 30 may be connected in a network.

As part of a network, the central computer 31 receives workroom data from one or more alterations workrooms 10 within the organization. Data may be transferred in the garment alterations management system in FIG. 1 via a network that includes an internal network 12 and an external network 14. The internal network 12 includes more than one workroom processor 30 connected by a local area network (LAN) 38. The internal network 12 operates in a building for a store or a tailor shop having more than one workroom 10. The LAN 38 may be implemented by a Novell™ local area network system.

The external network 14 includes one or more workroom processors 30 and electronic alterations ticket terminals 30 connected by a remote communications medium 37. The external network 14 allows workroom processors 30 from other stores to communicate with each other and to the central computer 11. The preferred remote communications medium 37 comprises a telecommunications link, but may include a radio-telecommunications link or wide area network media such as, fiber-optic or cable.

The workroom processor 30 includes a central processing unit 20, a workroom printer 32, a keyboard 34, a display unit 33, a selecting device 35, a voice response unit 39 and a communications link 48 to the electronic alteration ticket terminal 40.

The central processing unit 20 in a workroom processor 30 may include a general purpose computer having an operating system and application programs (described with reference to FIG. 3). The general purpose computer includes mass storage, program memory and an input/output system. The central processing unit 20 preferably operates the Microsoft WINDOWS™ 95 operating system using an Intel Pentium™ microprocessor. One of ordinary skill in the art can envision alternative computer platforms that include UNIX™, Macintosh™ or OS/2™-based systems.

The workroom printer 32 preferably includes a laser printer 32a and a ticket printer 32b. The display unit 33 preferably includes a color monitor and the keyboard 34 preferably includes a full-function standard keyboard. The selecting device 35 may be any point-and-click device that will operate with the WINDOWS™ operating system from Microsoft. Such point and click devices 35 include track balls, a mouse, pen input devices and touch screen interfaces.

The voice response unit 39 includes a telephone link 29 that provides customers with a connection to a garment status inquiry module and a speech synthesis module. The voice response unit 39 allows customers to place a telephone call using the number for the telephone link 29 of the voice response unit 39 to receive information regarding the status of an alterations ticket. The telephone link 29 comprising the voice response unit 39 may be dedicated to the task of providing alterations work information. The telephone link 29 may also include other customer service functions in addition to providing alterations work information.

The voice response unit 39 operates by interpreting customer input, which is provided by the pressing of telephone keys, and outputting vocal sounds over the telephone link 29 in response to the customer input. The vocal sounds are produced by a speech synthesizer.

The workroom processor 30 may be linked to the electronic alterations ticket terminal 40 via a ticket communications link 48. The ticket communications link 48 provides the electronics alterations ticket 40 with connectivity to the workroom processor 30. The ticket communications link 48 depends upon the location of the fitting area 4 in relation to the alterations workroom 10. The ticket communications link 48 may include a radio frequency link, an infrared link or a cable link.

The electronic alterations ticket terminal 40 includes the ticket printer 42, a fitting data display 43 and a fitting data input 44. The electronic alterations ticket terminal 40 is typically used in a fitting room 4 by the fitter. In a preferred embodiment, the electronics alterations ticket terminal 40 includes a personal digital assistant (PDA), such as the Apple MessagePad™, which is better known as the Newton™, which is the name of the product platform for the Message™. Any suitable PDA (such as the Microsoft Windows CE) may be used as an electronic alteration ticket 40. In addition, one of ordinary skill in the art can apprehend that any suitable portable terminal (such as a laptop computer) may be used in place of the PDA.

The fitting data display 43 includes the basic MessagePad™ display screen. Software operating in the electronic alterations ticket terminal 40 may provide a facility for a graphical user interface (GUI). The GUI facility allows for the display of display objects, or selectors, that are logically coupled to functions. The functions are performed by selecting the selector using the fitting data input 44. Alternative displays 43 may depend upon the hardware platform chosen for the electronic alterations ticket terminal 40.

The fitting data input 44 of an electronic alterations ticket terminal 40 includes a pen input 44a, an on-screen keyboard 44b, touch-screen buttons 44c and a microphone 44d. The pen input 44a is the basic input device of the Apple MessagePad™. The pen input 44a may be used with a handwritten character recognition facility that allows a user to hand write information on the screen using the pen input 44a. By using the pen input 44a and the handwritten character recognition facility, the user may treat the electronic alterations ticket terminal 40 as a paper alterations ticket and thereby reduce the training requirements.

The fitting data input 44 may also include an on-screen keyboard 44b that allows the user to select letters from the keyboard by touching the screen with the pen input 44a over the character to be entered. The on-screen keyboard 44b may be selectively enabled and displayed by touching the fitting data display 43 at an entry line that will receive the characters. Each character in the on-screen keyboard 44b is a selector coupled to a function that displays the character at the previously designated entry line.

The fitting data input 44 may also include a plurality of touch-screen buttons 44c implemented by selectors. The touch-screen buttons 44c may include an icon indicative of the function that is coupled for execution when the touch-screen button 44c is pressed.

The fitting data input 44 may also include a microphone 44d for use with a voice data entry facility.

The microphone 44d is illustrated in FIG. 1 as attached by a cable, however, it may be integrally mounted on the PDA. The voice data entry facility allows the user to speak the fitting data into a microphone which converts the spoken sounds into electronic signals. A voice recognition module translates the electronic signals into digital data according to speech patterns in the electronic signals.

Alternative fitting data input devices include a hardware keyboard, a point and select device or other suitable fitting data input devices.

The alterations ticket printer 42 may include any thermal, ink jet contact or other portable printer that operates with the PDA used. The alterations ticket printer 42 may be used to print out hard copy alterations tickets.

In a preferred embodiment, the garment alteration system has multiple electronic alterations ticket terminals 40 connected to the workroom processor 30 as shown at 14. Multiple electronic alterations ticket terminals 40 are useful in large stores having multiple fitting areas or one or more alterations workrooms. The electronic alterations ticket terminals 40 may be employed on the sales floors in the different departments.

The electronic alterations ticket terminal 40 may be used in a manner similar to a paper alterations ticket. The display 43 includes a form similar to that of a paper alterations ticket. The fitter writes the fitting data into the form on the screen using the fitting data input 44. Furthermore, the data input is automatically entered into electronic form during the fitting process and the price of the alterations is calculated and displayed immediately. As a result, the ability to store alterations data in electronic form eliminates the need for a worker to enter information from a paper alteration ticket into a computer screen. In addition, lost income due to pricing errors of fees is eliminated.

Alternatively, the electronic alterations ticket terminal 40 may be used as a data entry device. Fitters may use paper tickets during the fitting process. A worker may then enter the data on the paper tickets into the electronic alteration ticket terminal 40 at the end of the day.

One of ordinary skill can appreciate that the above described system configurations are provided by way of example. Variations are possible without departing from the scope of the invention.

II. Electronic Alterations Ticket Terminal

Figure 2:
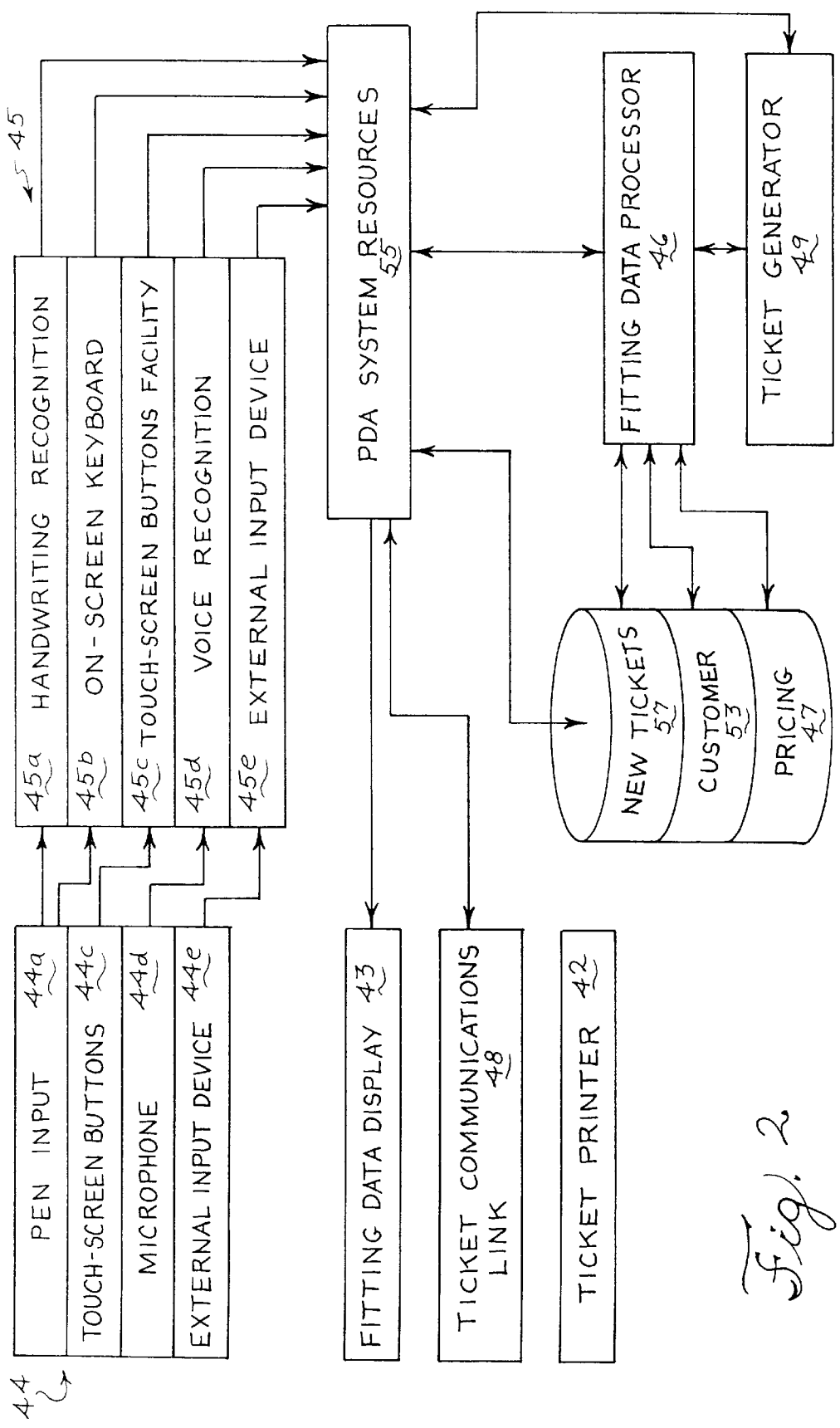
FIG. 2 is a block diagram of a preferred embodiment of the electronic alterations ticket terminal in the garment alteration system in FIG. 1.

Although a preferred workroom processor 30 includes facilities for creating new alteration tickets, the workroom processor 30 preferably receives alteration ticket information from the electronic alteration ticket terminal 40. FIG. 2 is a block diagram of a preferred embodiment of the electronic alterations ticket terminal 40. The electronic alterations ticket terminal 40 includes the fitting data input 44, one or more input facilities 45, the fitting data display 43, the ticket communications link 48, the ticket printer 42, a PDA system resources 55, a fitting data processor 46, a new tickets data base 51, a customer data base 53, a pricing data base 47 and a ticket generator 49.

The hardware components in FIG. 2 are discussed with reference to FIG. 1 above. In a preferred embodiment, the hardware components of the electronic alterations ticket terminal 40 includes the PDA and the hardware accessories available for the PDA. Hardware accessories typically available for PDA's include the fitting data input 44, the fitting data display 43, the ticket communications link 48 and the ticket printer 42.

The PDA includes system resources 55 encompassing hardware and software resources such as memory, an operating system and an input/output system. The operating system in a preferred embodiment includes the Newton™ Operating System.

The fitting data processor 46, the input facilities 45, the ticket generator 49 and the pricing, new tickets and customer data bases 47, 51, 53 comprise the application software components of the electronic alteration ticket terminal 40. A copy of the actual code used to implement the application software components of a preferred electronic alteration ticket terminal 40 is included in the microfiche appendix. The code is written in the Newton Script™ programming language and may be prepared for execution using the Newton Toolkit systems from Apple.

The fitting data processor 46 in a preferred embodiment is an application program that provides the user with functions (described with reference to FIG. 6) for creating new alteration tickets, viewing the details of all new alteration tickets at any given time and communicating tickets or data base information with the workroom processor 30. When invoked from the main interface of the PDA, the fitting data processor 46 displays a new ticket list user interface (described with reference to FIG. 6). The new ticket list interface includes customer information and price information associated with each new ticket that has been created.

A selector is provided on the new ticket list screen interface to invoke the process of creating a new ticket. The process of creating a new ticket is carried out using screen interfaces that prompt the user for fitting data. As the user responds to the prompts, the data is stored in the new ticket data base 51.

The fitting data processor 46 also provides a selector for connecting to the workroom processor 30 to transmit new tickets to the workroom processor, update the customer data base 53 and update the pricing data base 47. The fitting data processor 46 establishes a connection via the tickets communication link 48.

In transmitting new tickets to the workroom processor 30, the new tickets are retrieved from the new ticket data base 51 once the connection is established. In a preferred embodiment, new tickets are removed from the new tickets data base 51 and moved to the workroom processor 30. Incomplete tickets are not transmitted thus, maintaining the data integrity of the workroom data base.

The updating of the customer data base 53 and the pricing data base 51 performed by establishing a communications link to the workroom processor 30 with a request for an update. The Workroom processor 30 then transmits the pricing and customer data from a database to the electronic alteration ticket terminal 40.

The input facility 45 operates with the fitting data input 44 to provide data in a format that is usable by the fitting data processor 46. If the user chooses the pen input as the fitting data input 44, one of three pen input facilities may be used.

The pen input 44a may be used with a handwriting recognition facility 45a which translates the handwriting motion of the pen on the display into data in digital form as the user writes on the screen. The pen input 44 may also be used to enter characters from the on-screen keyboard facility 45b. The on-screen keyboard facility 45b provides an image of a keyboard on the fitting data display 43 that allows the user to select character keys directly from the display 43. The pen input 44 may also be used to select items from lists, check boxes and radio buttons.

The microphone 44d may interface into a voice recognition facility 45d that interprets voice input into fitting data in digital form. The voice recognition facility 45d uses speech recognition software to process the data.

An external input facility 45c such as a keyboard may be added to the PDA. Because the external input device facility 45d operates as a standard keyboard interface in a conventional way, no further description is required.

The ticket generator 49 and the ticket printer 42 may be provided if printed tickets are desired. The ticket generator 49 retrieves alterations ticket information from the fitting data processor 46 to generate a printed copy of an alterations ticket. The ticket generator 49 transmits the alterations ticket to the electronic ticket printer 42.

It is to be apprehended by one of ordinary skill in the art that the preferred embodiment of the electronic alterations ticket terminal described above is only one example of the present invention. Alternative embodiments, such as those possible using a laptop computer as opposed to a PDA, are possible without departing from the scope of the invention.

III. Workroom Processor

Figure 3:
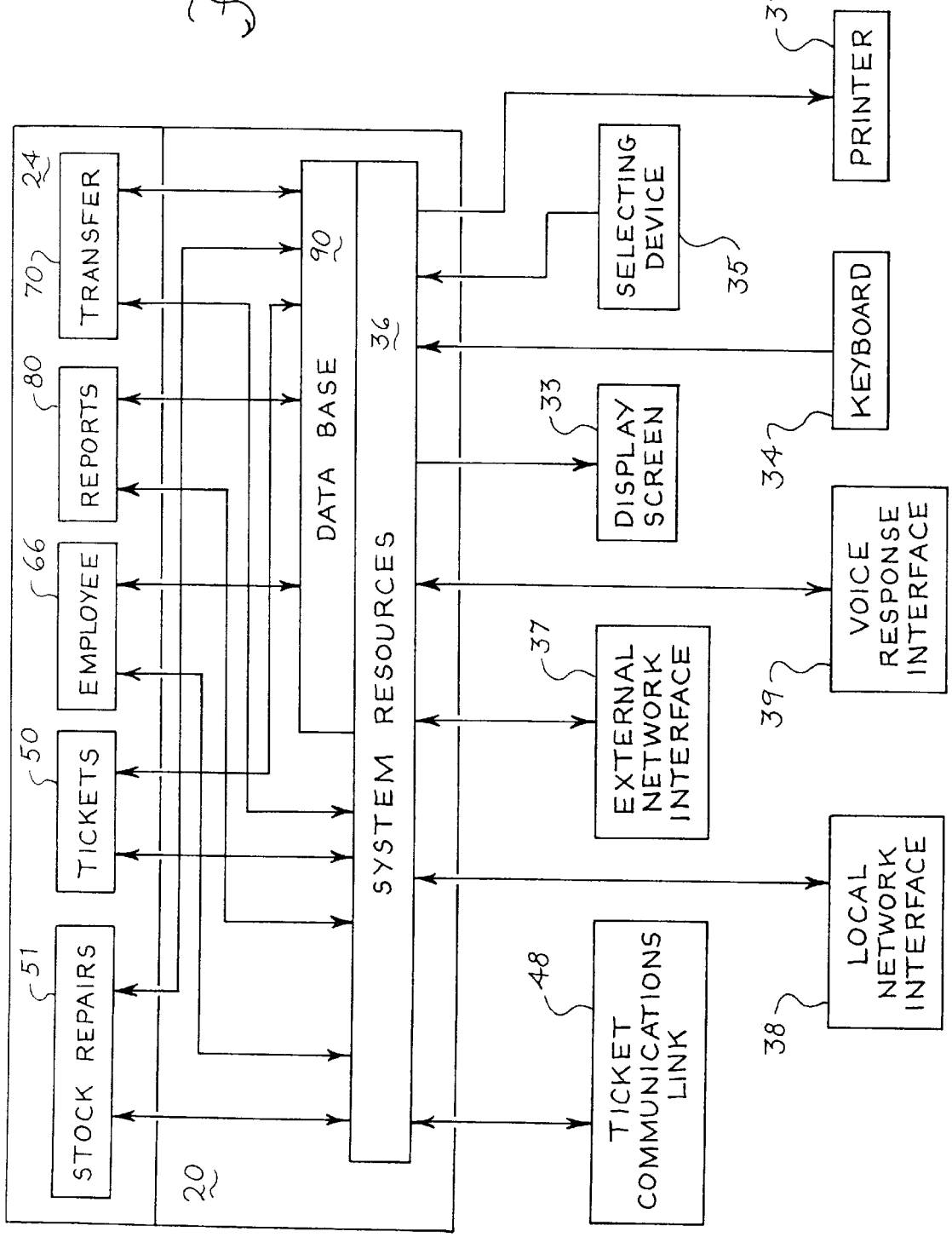
FIG. 3 is a block diagram of a preferred embodiment of the workroom processor in the garment alteration system in FIG. 1.

FIG. 3 is a block diagram of a preferred embodiment of the workroom processor 30. The workroom processor in FIG. 3 includes the central processing unit 20 and interfaces to the peripheral devices described above, which include the electronic alterations ticket communications link 48, the local network interface 38, external network interface 37, the voice response unit 37, the display screen 33, the keyboard 34, the workroom printer 32 and the selecting device 35.

The central processing unit 20 includes the system resources 36, a data base 90 and an application software system 24. The system resources 36 include the hardware and software resources that enable communication between the application software 24 of the workroom processor 30 and the peripheral devices listed above. The system resources 36 typically include an operating system, a basic input/output system, hardware drivers, a graphical user interface software system, system maintenance tools (such as a backup tool) and other components that comprise typical general purpose computers.

The application system 24 in a preferred embodiment is a collection of computer programs that may be invoked from the WINDOWS™ user interface. A copy of the actual code used to implement the computer programs is contained in the microfiche appendix. The code was developed as an object-oriented software system using the Microsoft Visual C++ development system. The Microsoft Visual C++ development system includes graphical user interface development tools that enable the representation of objects using graphical images. Such graphical images include icons, display windows, graphical selectors (i.e. buttons), droplists, menus and text areas. The tools provided in the Microsoft Visual C++ development system work with the graphical user interface provided by the WINDOWS™ operating system.

Operating systems having graphical user interface capabilities (e.g. Windows™, Macintosh™ OS) include tools for defining icons that invoke application software. An icon may be defined to invoke an initialization function that displays the main display interface for each module in the application system.

The application system 24 in FIG. 3 includes a tickets module 50, a employee module 66, a transfer module 70, a stock repairs module 51 and a reports module 80. Each module is an executable, independent computer program that shares information with the other modules via the data base 90. Each module may include user interfaces and security features for controlling user interaction. The modules represent basic components and functions in an alteration workroom. Other modules may be added in a preferred embodiment to provide administrative and maintenance functions, such as backup and presentation configuration functions. One of ordinary skill in the art can apprehend that these components are described herein as examples. Preferred embodiments may comprise one or more executable programs and may have differing software structures. Other embodiments may also be based on a function driven configuration as opposed to the data driven configuration of the object-oriented system.

The tickets module 50 provides the user with the functions for creating new alteration tickets, modifying alteration tickets, updating the status of alteration tickets as work is performed and viewing the details of all alteration tickets being processed at any given time. The tickets module 50 operates by maintaining the workroom ticket list (described with reference to FIG. 5). The workroom ticket list is a history of the work performed by the workroom. The history is inherently current due to the ability of the tickets module 50 to update the ticket status as work is performed.

The employee module 66 provides functions for maintaining employee information, schedules and a user interface for updating information and employee schedules. The information maintained by the employee module 66 may include a name, address, social security number, salary and work schedule for each employee in the alterations workroom. Employees may be scheduled to specific types of alterations work, such as gender specific alterations or department specific alterations (e.g. bridal). The employee module 66 maintains the schedule information permanently to provide an employment history of the employee's past work. The employment history may be supplemented with more specific information regarding the tasks performed by the employee. For example, time spent performing fittings and time spent in meetings may be included in the schedule information.

The transfer module 70 provides a means for coordinating a transfer of garments to another alterations workroom. The transfer module 70 includes user interfaces that enable a user for selecting the destination of the transfer and the garments that are to be transferred.

The stock repairs module 51 is similar to the tickets module in purpose and operation. One difference is that the stock repairs module 51 is used for the repair of garments. Garments may need to be repaired as a result of manufacturers' errors, damage in shipping or wear and tear from the customers that try on the garments. The garment repairs are performed by the workroom (or store) at no cost to the customer. The cost to the alterations workroom, however, can be substantial. By managing stock repairs in a manner similar to that of alteration tickets, the alteration workroom can obtain data that may be used to determine how much income is lost to stock repairs. The essentially real-time nature of the information management of stock repairs makes it easy for a workroom to identify and respond to problem areas quickly. Moreover, repairs can be tracked according to vendors to enable the workroom to charge back repair costs to the vendor.

The reports module 80 provides reports that are meaningful to the management of the alterations workroom. The reports generated by the report modules 80 are relevant to the status of the alterations workroom as well as to analysis of the workroom performance.

The reports module 80 operates by taking advantage of the real-time nature as well as the accuracy of the data. The tickets module 50 can receive changes in the status of alterations as the work is performed. The reports module 80 can access the corresponding data to produce income, cost, efficiency, quality, timeliness, volume and detailed analysis reports that represent the state of the workroom as soon as the data is available. At the end of a work day, the workroom manager can view a set of reports generated from data that includes data collected from alterations performed during the day. The reports may enable the manager to isolate problem areas immediately, and to implement steps to solve the problems starting on the next day.

One of ordinary skill in the art can appreciate that the preferred embodiment of the workroom processor 30 has been described above by way of example, and that alternative embodiments are possible. For example, application system 24 has been described as consisting of a set of independently executable computer programs that share a common data base. The tickets module 50, the employee module 66, the transfer module 70, the stock repairs module 51 and the reports module 80 may be replaced by a system of computer programs that combines one or more of the modules, or be a system that includes one single, executable computer program that combines the functions of all of the modules. Other variations are possible without departing from the scope of the invention.

IV. The Voice Response System

Figure 4:
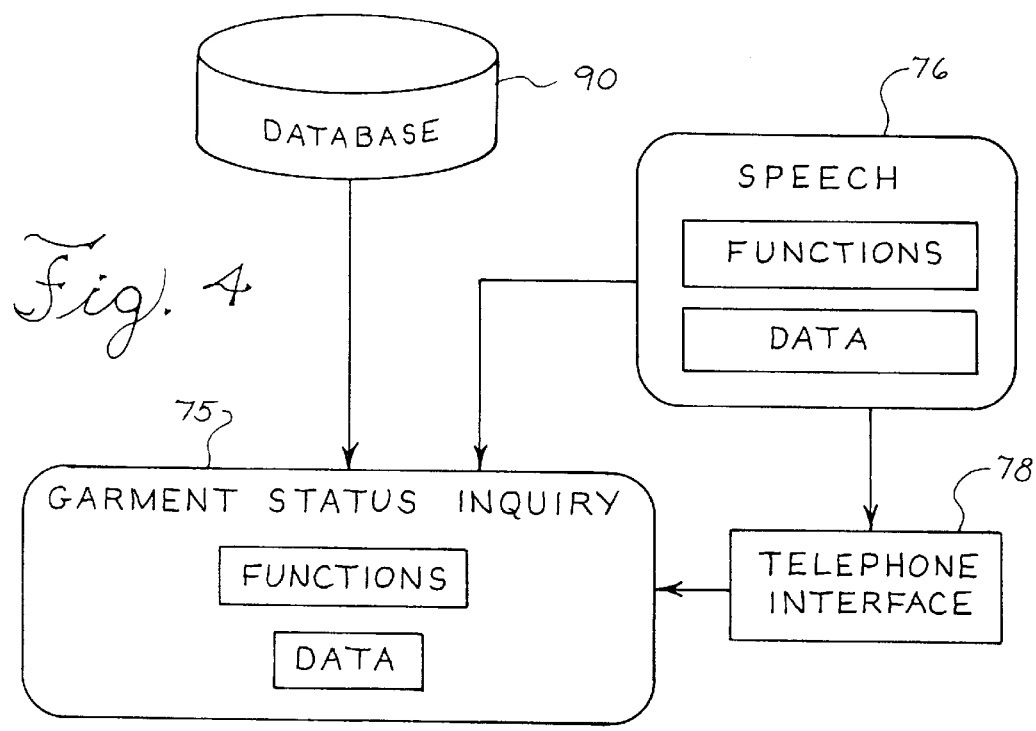
FIG. 4 is a block diagram of the voice response facilities of the workroom processor in FIG. 3.

FIG. 4 is a block diagram of the voice response unit 39 which responds to customer inquiries into the status of a garment. The voice response unit 39 includes a speech synthesizer 76, a garment status inquiry object 75, and a telephone interface, or modem 78.

The garment status inquiry object 75 includes functions that connect to a modem 78 when a customer calls to inquire into the status of alterations. The customer identifies the garment for which the inquiry is made by entering a sequence of phone keys that identify the garment. The sequence of keys may relate to the ticket number, the customer name, the receipt number or the garment. The status inquiry object 75 retrieves the electronic alterations ticket 45 that matches the ticket information provided by the user. The status inquiry object 75 may transmit the information to the user via the speech synthesizer 76.

The voice response unit 39 may be provided as a utility that is constantly operating in the background. The voice response unit 39 availability may be automatically controlled by software to operate only during the hours in which the store is closed.

In a preferred embodiment, the voice response unit 39 may be developed using a speech synthesis development system such as Visual Voice™ from Artisoft, Corp. In addition, the telephone interface 78 may include telephony interface cards from Dialogic, Inc.

One of ordinary skill in the art may apprehend variations that do not depart from the scope of the invention.

V. Alternative Embodiments

The hardware and software components of a preferred embodiment of the garment alterations workroom management system may be modified according to a variety of alternative embodiments. For example, a garment alteration management system application program may be developed using an operating system other than a Windows™ operating system. The workroom processor 30 may be developed for a Macintosh™ system, OS/2™ or UNIX™. In addition, a general purpose personal computer may be replaced with a mainframe or a mini-computer that provides access through basic input/output terminals. In another embodiment, components of the workroom processor 30 may communicate over the Internet.

Alternative embodiments for the electronic alteration ticket terminal 40 include a laptop computer or a basic keyboard terminal. The electronic alteration ticket terminal 40 may also operate as a component of the workroom processor 30 using the keyboard 34 or the point-and-click device 35 for input and the display screen 33 or the printer 32 as output.

Alternative development systems may be used to develop the application software 24. For example, Microsoft Visual Basic, Smalltalk and Eiffel are object-oriented languages having development systems that may be used in a preferred embodiment. Alternative embodiments may also be developed as function oriented, as opposed to object-oriented. Programming languages, such as 'c' and Pascal may be used for function-oriented and object-oriented development.

VI. Alteration Ticket Data Structure

In a preferred embodiment, the tickets module 50 and the electronic alterations ticket terminal each provide a means for creating alteration tickets and for storing the tickets as electronic alteration tickets. The electronic alteration tickets are stored in memory according to an alteration data ticket structure, aspects of which will now be described with reference to FIGS. 5A–5E.

FIG. 5A illustrates the alteration data structure hierarchy in terms of the fields 92 and the levels 94. The fields 92 of the alteration ticket data structure are defined according to the actual data used by an alteration workroom. The levels 94 indicate how the fields 92 are structured in relation to the alterations workroom workflow.

As shown in FIG. 5A, the sales receipt fields are at the highest level of the hierarchy. As alteration tickets are created, the system collects an increasing number 'n' of sales receipts.

When a customer purchases multiple garments, multiple garments associated with a single sales receipt may be delivered to an alterations workroom for alterations. A workroom typically arranges alterations tickets to include up to four garments. If a sales receipt includes more than four garments that need alterations, multiple tickets are included under the same sales receipt. Furthermore, garments may subsequently require multiple fittings during the alterations process and each fitting requires the performance of at least one alteration task.

In a preferred embodiment, the hierarchy of the alteration ticket data structure accounts for the above described process. Each sales receipt contains a number 'n' of Ticket fields to accommodate the situation in which more than four garments require alterations. Each Ticket field contains as many as four garment fields, or garment tags. Since each garment may be subject to multiple fittings, the garment fields contain a number of fittings fields. Since there are a number of alteration tasks defined for each fitting, a number alterations fields are contained in each fitting field.

In a preferred embodiment, the hierarchy illustrated in FIG. 5A is used to map the storage of the data in memory. Storing the data according to the hierarchy in FIG. 5A provides for meaningful use of the garment alterations data. The hierarchy proves extremely useful in the generation of reports by the reports module 80, or in the operation of important management functions such as the forecasting function (described below with reference to FIG. 16).

The fields 92 discussed with reference to FIG. 5A may be expanded to include sub-structures of data elements relevant to each field. For example, the ticket field may include a ticket identifier, a customer identifier, sales information, the number of garments or tags and status information such as, the earliest promise date associated with the ticket. FIG. 5B is an example of how a ticket data structure may be organized in the data storage (e.g., data base 90) in the workroom processor 30. Similarly, FIG. 5C is an example of a garment data structure, and FIG. 5D provides examples of a fitting data structure 95, an alteration data structure 96 and an alteration price list data structure 97.

FIG. 5E illustrates how data may be defined to establish price type codes according to type of alterations. The Code column is used in an instantiation of price data for an alteration according to the alteration price list 97 in FIG. 5D. The entry in the price type code element indicates how the alteration is to be priced in terms of quantity, unit minutes and unit price. The columns for the 'Total Minutes Equals' and the 'Total Price Calculated By:' indicate the pricing formulas used for each price code. The display of alterations presented to the user during data entry varies according to the price type code. Fields that are enterable based on the code are white and available to user. Fields that are not enterable are gray and not available to the user.

The advantage of using the price codes defined in FIG. 5E is the flexibility provided for determining the price of alterations. The prices are determined in a predictable manner and by resorting to data that is maintained by the system.

One of ordinary skill in the art can apprehend that variations exist in the hierarchical data structure illustrated in FIGS. 5A–5E.

VII. Ticket List Display

Figure 6:
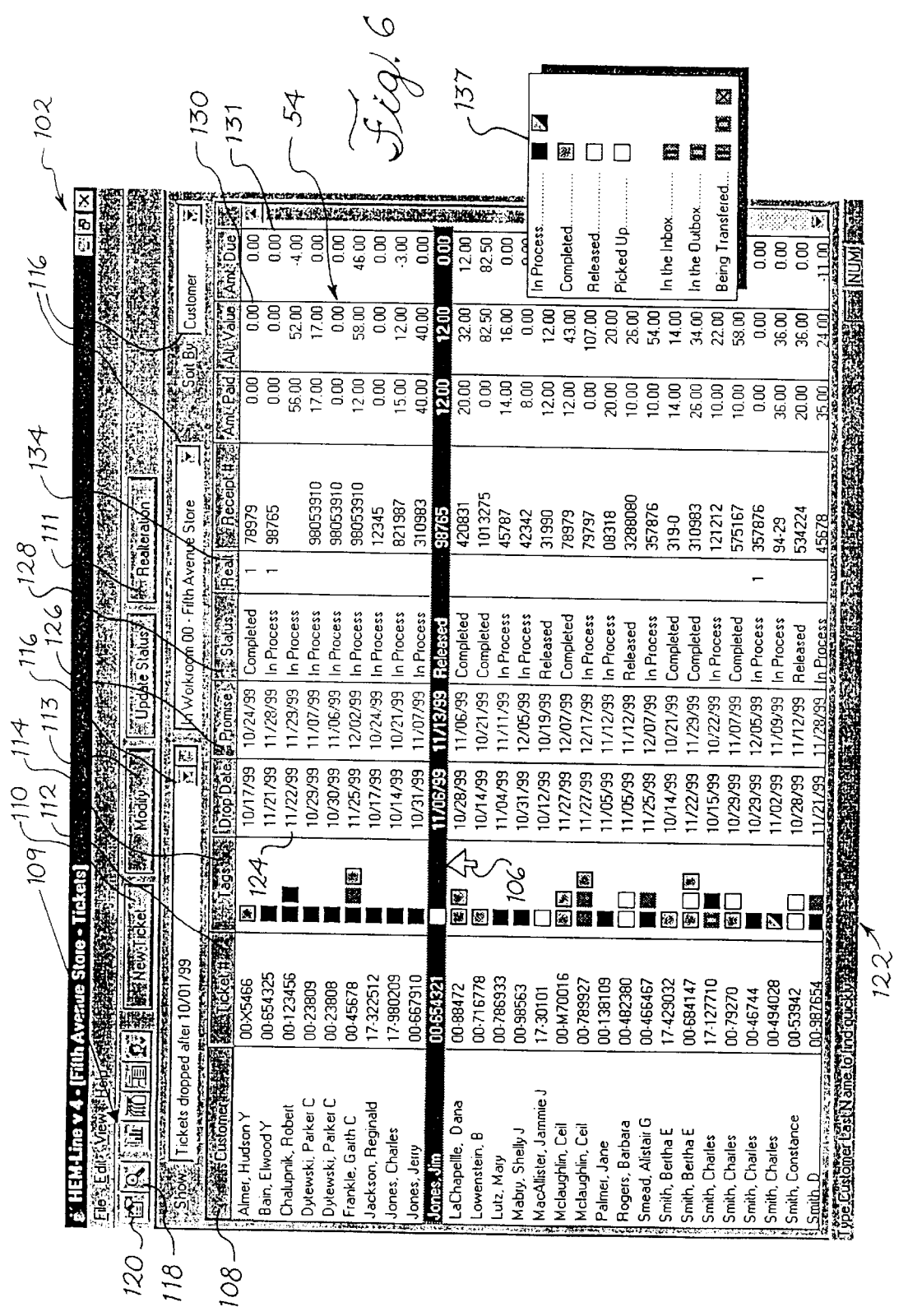

FIG. 6 illustrates a ticket list 102 which is the main user interface of the tickets module 50. A user may interact with the ticket list 102 and other display interfaces employed in a preferred embodiment by manipulating selectors. A selecting device 35 or keys on a keyboard 34 are used to select selectors that typically appear as buttons, text lists or menu items on display interfaces. The selecting device 35 is used to maneuver a pointer 106 to a selector. The function relating to the selector is executed when the selector is clicked. In addition, text boxes and check boxes may be provided on the display interface to allow the user to set variables to desired values.

One advantage of the ticket list 102 is that selectors for invoking functions associated with managing an alterations workroom are provided on a display screen that also provides management information. The selectors for invoking management functions include a ticket creating selector 110, the alterations ticket selectors 54, a modify selector 113, a ticket properties selector 120, a re-alterations selector 111, a forecast selector 109, a ticket finding selector 118 and view filter drop lists 116.

When the user selects the ticket creating selector 110, a series of screen interfaces guides the user through the process of creating a new alterations ticket. This process will be described further below with reference to FIGS. 9 and 10A–10D.

When the user selects a specific alteration ticket 54, a screen interface prompts the user for information regarding a change in status. For example, when a worker has completed an alteration, the worker selects the alteration ticket 54 for the garment and indicates the alteration performed and the fact that he or she performed the alteration. This process will be discussed further below with reference to FIGS. 13 and 14.

The ticket properties selector 120 opens a screen interface that contains information regarding the alteration ticket 54 that is presently highlighted. The information may include the status, workers that performed any alterations that have already been performed, whether the ticket is part of a multiple tickets sales receipt and any other item of data that may be stored in the data base 90 pertaining to the selected ticket. It also provides a display of the complete customer data linked to the ticket by the customer identifier.

The find ticket selector 118 causes a prompt for a ticket number to appear. When the user enters the number, the alterations ticket 54 associated with the ticket number is highlighted.

The re-alteration selector 111 is present on the ticket list 102 screen only when the alteration ticket highlighted includes at least one released garment tag. When selected, the re-alteration selector 111 initiates the re-alteration process (described below with reference to FIGS. 9 & 10D).

The forecast selector 109 initiates the forecast function. The forecast function is described below with reference to FIGS. 16 & 17A–C.

The ticket list 106 includes information that a workroom manager would want to know most about a specific alteration ticket 54. This information is contained in columns listing customers 108, ticket numbers 112, tags 114, drop dates 124, promise dates 126, the ticket status 128, re-alteration indicator 134, the alteration value 130, the amount already paid 132 and the amount still due 131.

The tags column 114 includes icons 122 that indicate the status of the alteration ticket. Each icon 122 represents a tag that belongs with the alteration ticket. The appearance of the icon 122 is coded to communicate the status of the alteration ticket according to a legend 137. The advantage of using a coded appearance is that a manager can tell at a glance where the garment is in the process. Another glance at the promise date column 126 gives the manager an indication of how urgent the alteration ticket is becoming. Furthermore, if an alteration ticket is past due, the amount due column 131 may provide a quick answer as to why the work has not been performed. The promise date for late garments is displayed in red to highlight the situation.

The re-alterations indicator 134 indicates whether or not the alterations ticket is a re-alteration, and how many times a garment has been re-altered.

The filter selectors 116 provide a way to control which tickets are displayed and in what order.

Figure 7:
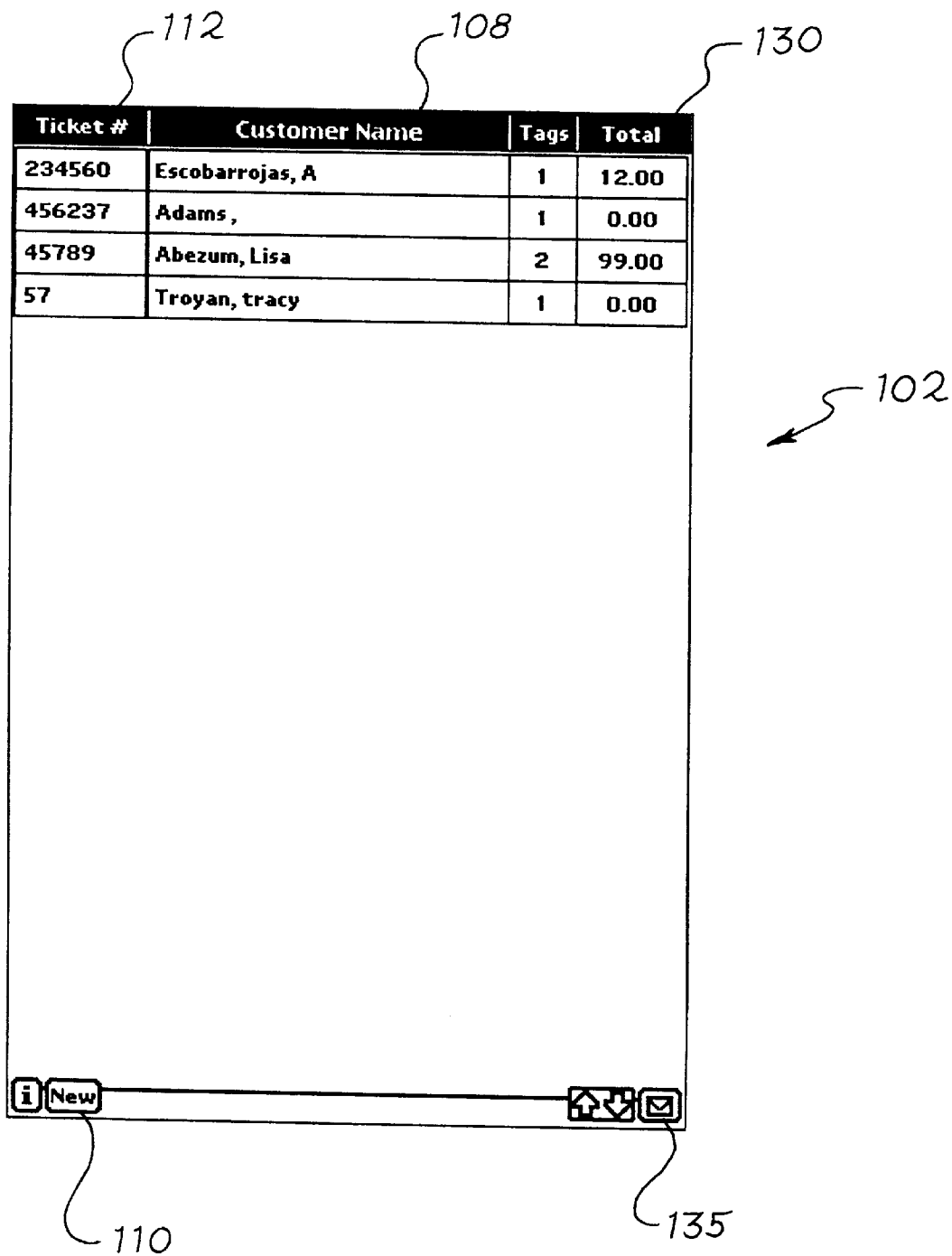
FIG. 7 depicts the display interface for the new tickets list of the electronic alterations ticket terminal in FIG. 2.

The electronic alterations ticket terminal 40 also uses a ticket list interface 102 as shown in FIG. 7. Because of the smaller size of most PDA screens, the number of columns displayed is reduced. As shown in FIG. 7, the customer column 108, the ticket number column 112 and the alteration value column 130 are displayed. The display also contains a new ticket selector 110 and a connect selector 135. The ticket list 102 in FIG. 7 operates in a manner similar to the ticket list described above with reference to FIG. 6.

Figure 8A:
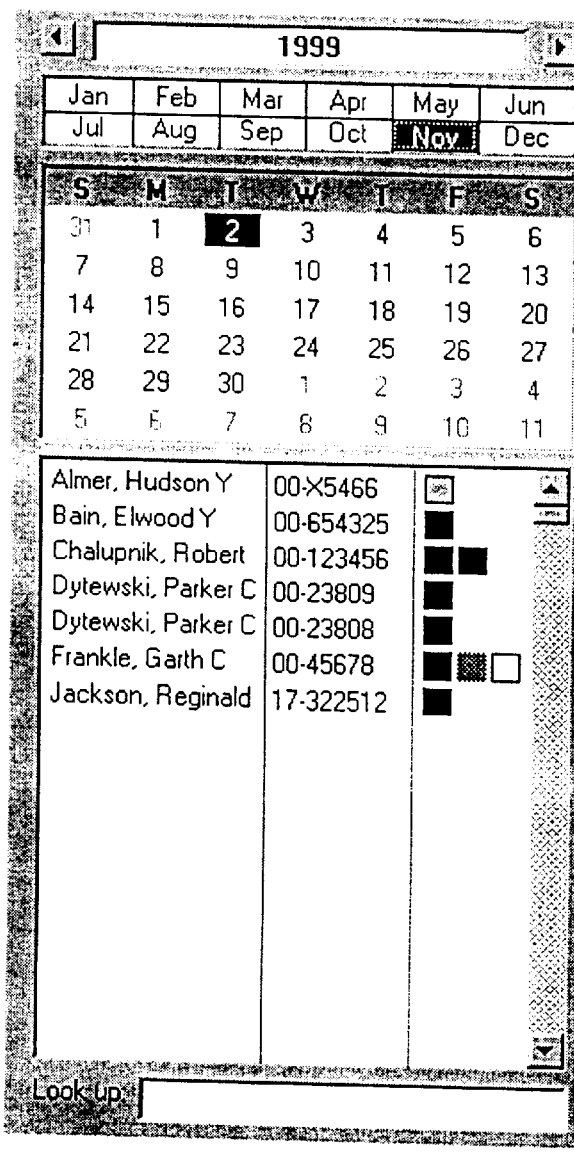
FIGS. 8A and 8B depict the display interface for viewing the ticket list using a calendar view.
Figure 8B:
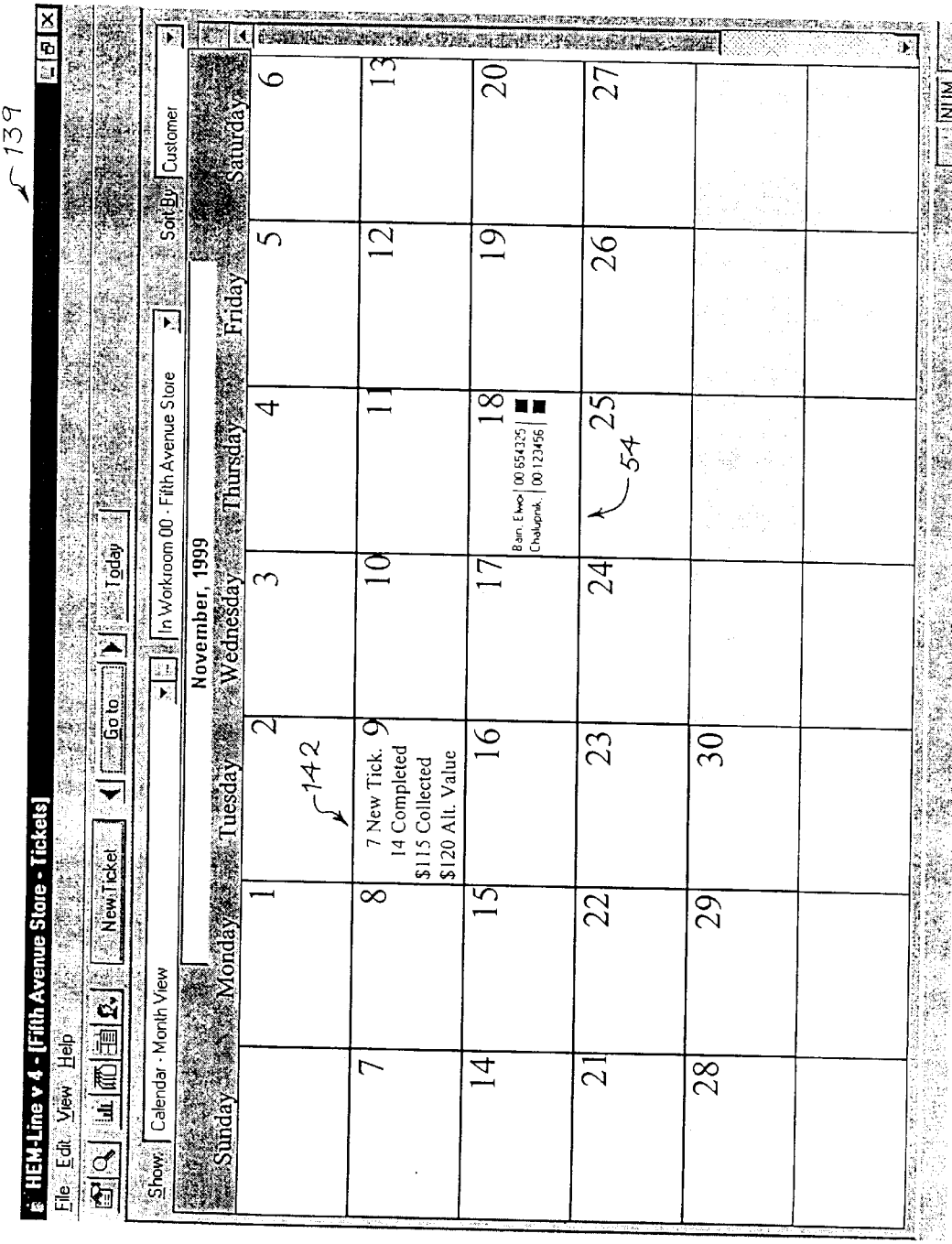

The filter selectors 116 may be used to provide alternative views having specific strategic functions for the alterations workroom manager. For example, FIGS. 8A and 8B illustrate a calendar view 139 alternative to the ticket list 102. In the calendar view 139, the display presents a screen having a standard calendar appearance and alteration ticket selectors 54 are placed on the date indicated by the promise date column 126. The icons for the alteration ticket selectors 54 may be stacked on top of one another, or a day list selector 141 may be used to display only the tickets promised for the given day in a separate display screen.

Each day in the calendar view 139 may also provide a summary 142 for the day. The summary 142 reflects whether information as history, if the day passed, or as a schedule if the day is in the future. For example, a summary 142 for a day that has passed may include the number of garments completed, the number of new garments delivered to the workroom, the total dollars collected, the total dollars due and total alteration value for the day. A summary 142 for a day in the future may include the number of labor minutes scheduled and the number of minutes of work due on that day.

Some advantages of using the calendar view 139 are that it presents information in a more easily discernible format focusing on each day's work; it provides quick access to important summary information without having to run any reports; and a workroom manager can forecast work according to the time period illustrated. Calendar views 139 may be displayed for any period of time, such as a day, a week, a month, a year or user specified time periods.

One of ordinary skill in the art can apprehend that other views may be used without departing from the scope of the invention. It is to be understood that the appearance of the screen interfaces described above in no way limit the invention. Furthermore, selectors may be designed to provide many relevant garment alteration management functions. Neither the selectors included, nor selectors not included are intended to limit the scope of the invention.

VIII. Creating an Alteration/Re-Alteration Ticket

Figure 9:
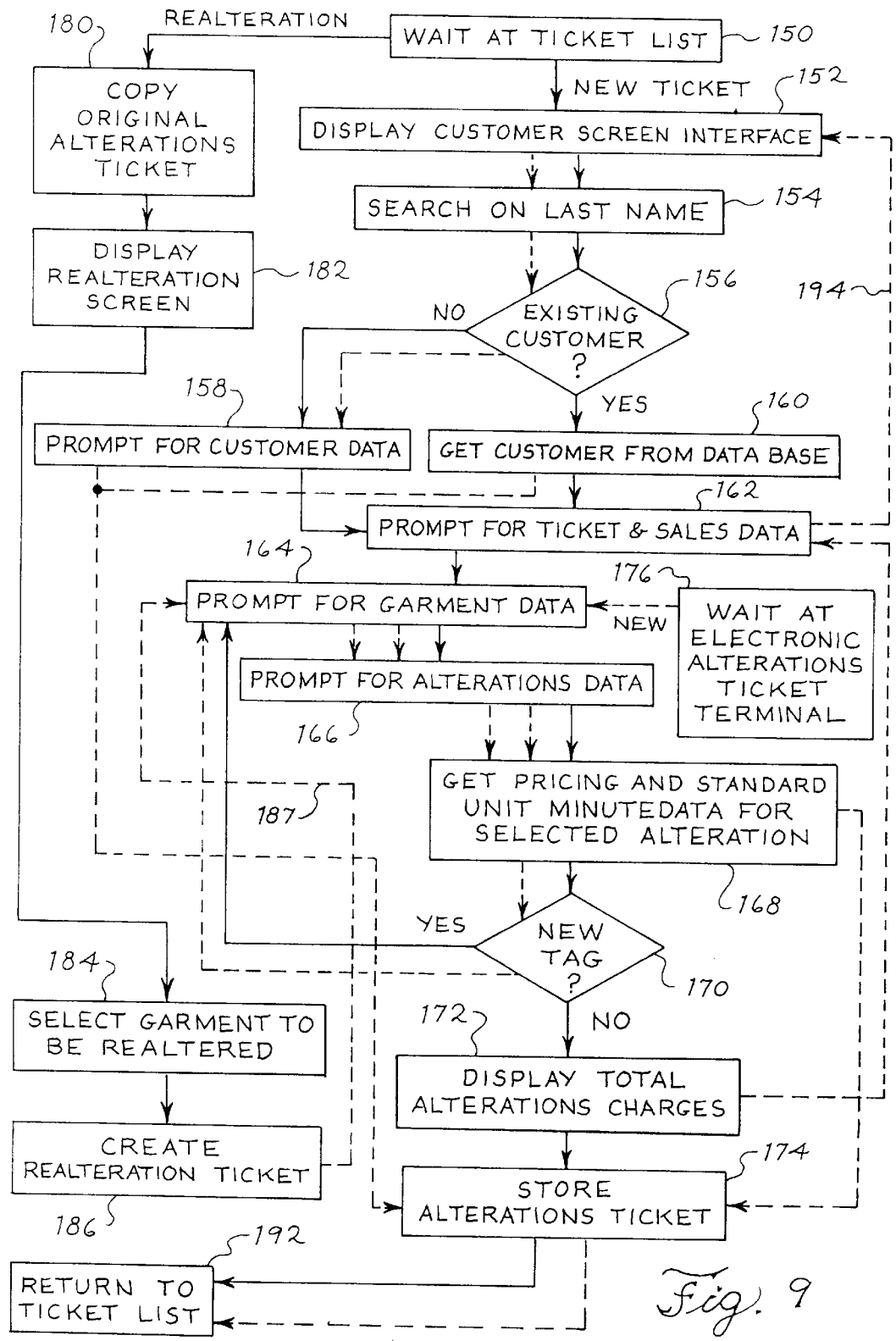
FIG. 9 is a flow chart illustrating the alteration ticket creation process of the invention.

FIG. 9 is a flow chart for a preferred method for creating an alterations ticket. The process of creating an alterations ticket may be performed by application programs in the electronic alterations ticket terminal 40 or in the workroom processor 30 (both illustrated in FIG. 1). The actual code for creating an alterations ticket for both the preferred electronic alterations ticket terminal 40 and the preferred workroom processor 30 is included in the program provided in the Microfiche Appendix.

At step 150, the ticket list 102 (or calendar view 139) is waiting for user input. If the user selects the "New Ticket" selector 110 (in FIG. 6), the display switches to a screen prompting for a customer name. At step 152, the user enters the customer name first to enable the system to conduct a customer search as shown at step 154. If a customer was found, decision block 156 indicates that an existing customer is found and the customer data is retrieved from the data base at step 160. Otherwise, a screen display prompts for the customer data at step 158.

Figure 10B:
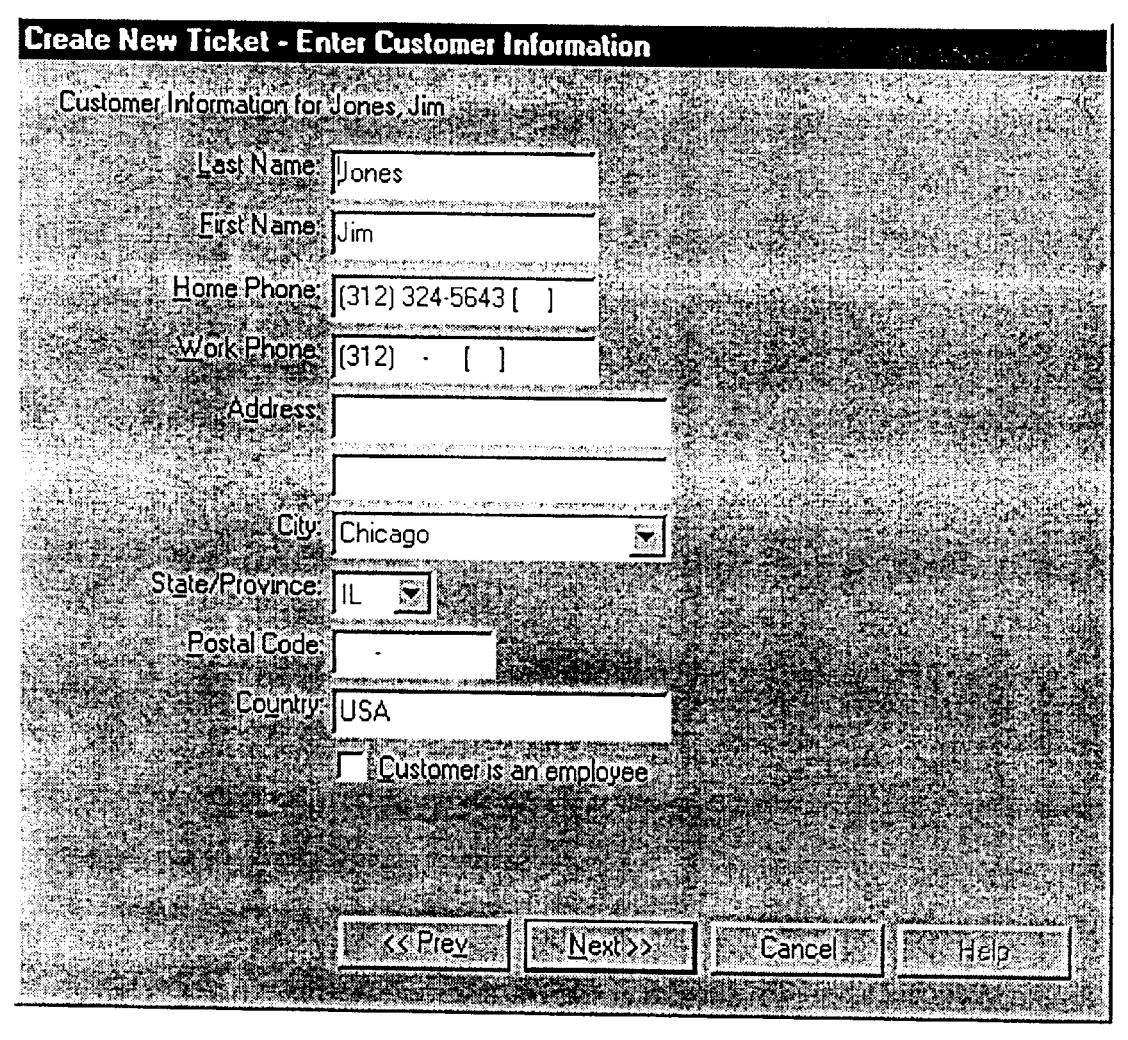

FIGS. 10A and 10B depicts an example of a customer data entry screen in a preferred embodiment. At step 162 in FIG. 9, the user answers the prompts in FIG. 10c for ticket and sales data. The user enters the appropriate data and selects the "Create" button to continue to step 164 of FIG. 9.

Figure 10D:
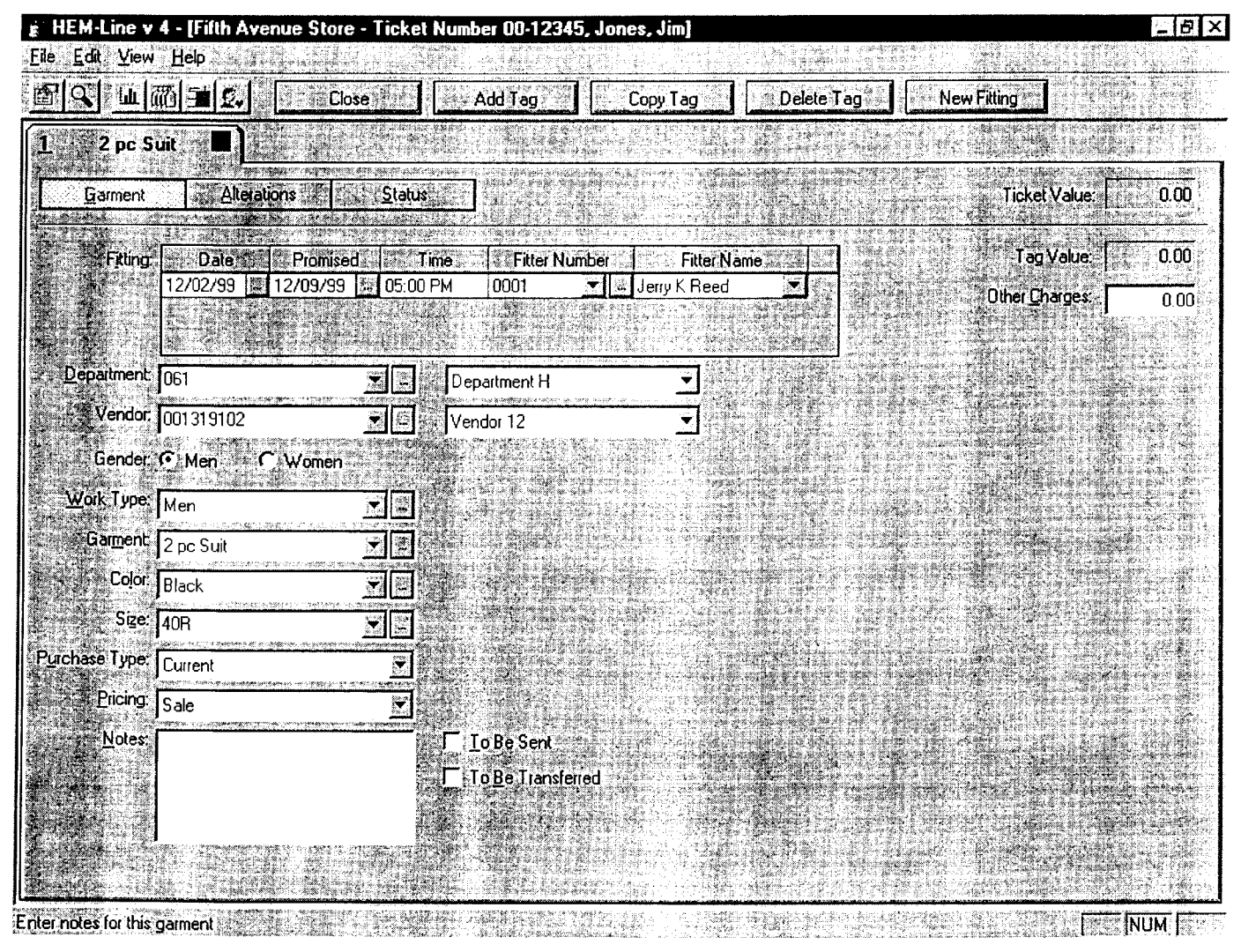
Figure 10E:
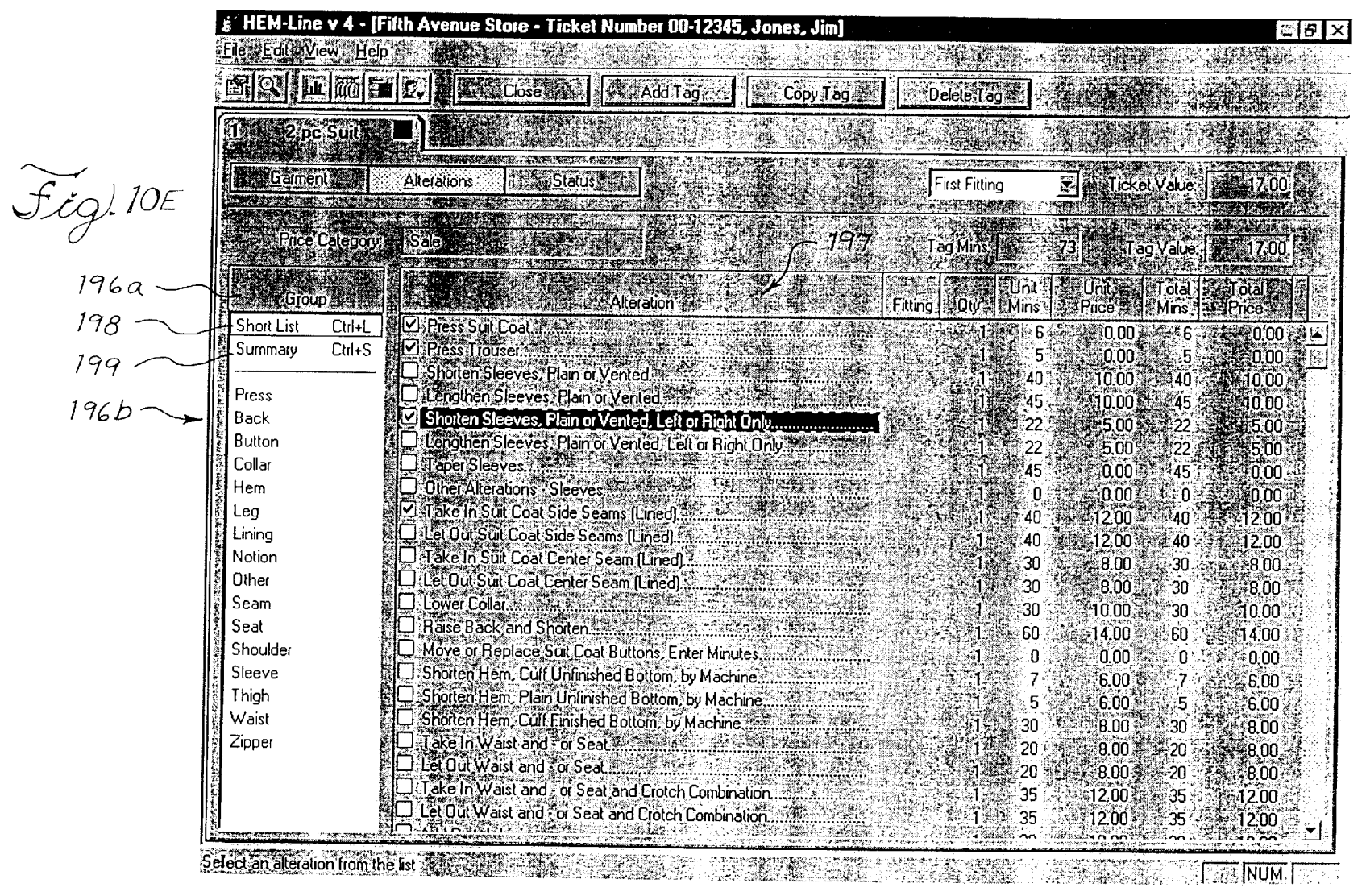
Figure 10G:
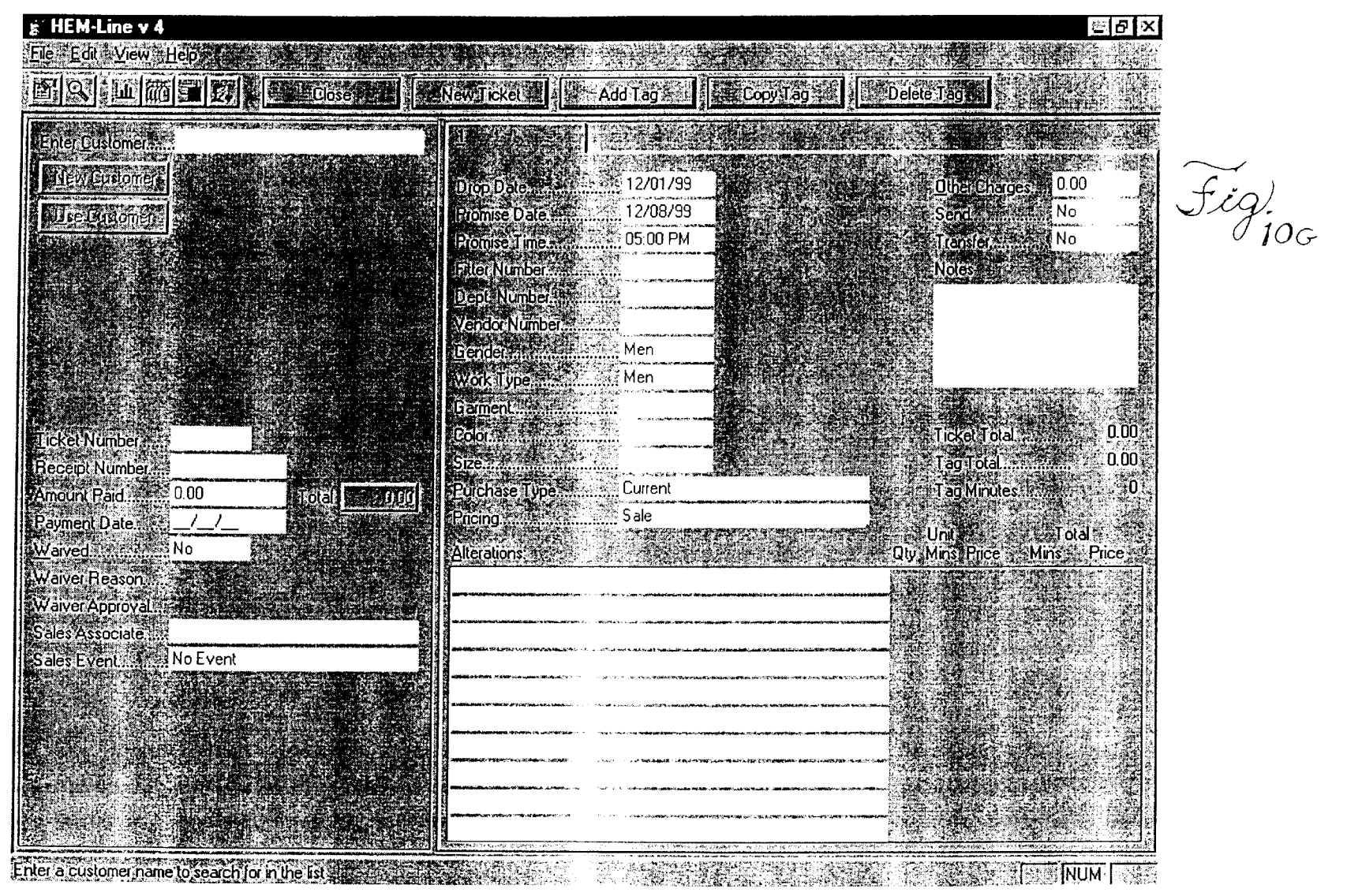
Figure 10H:
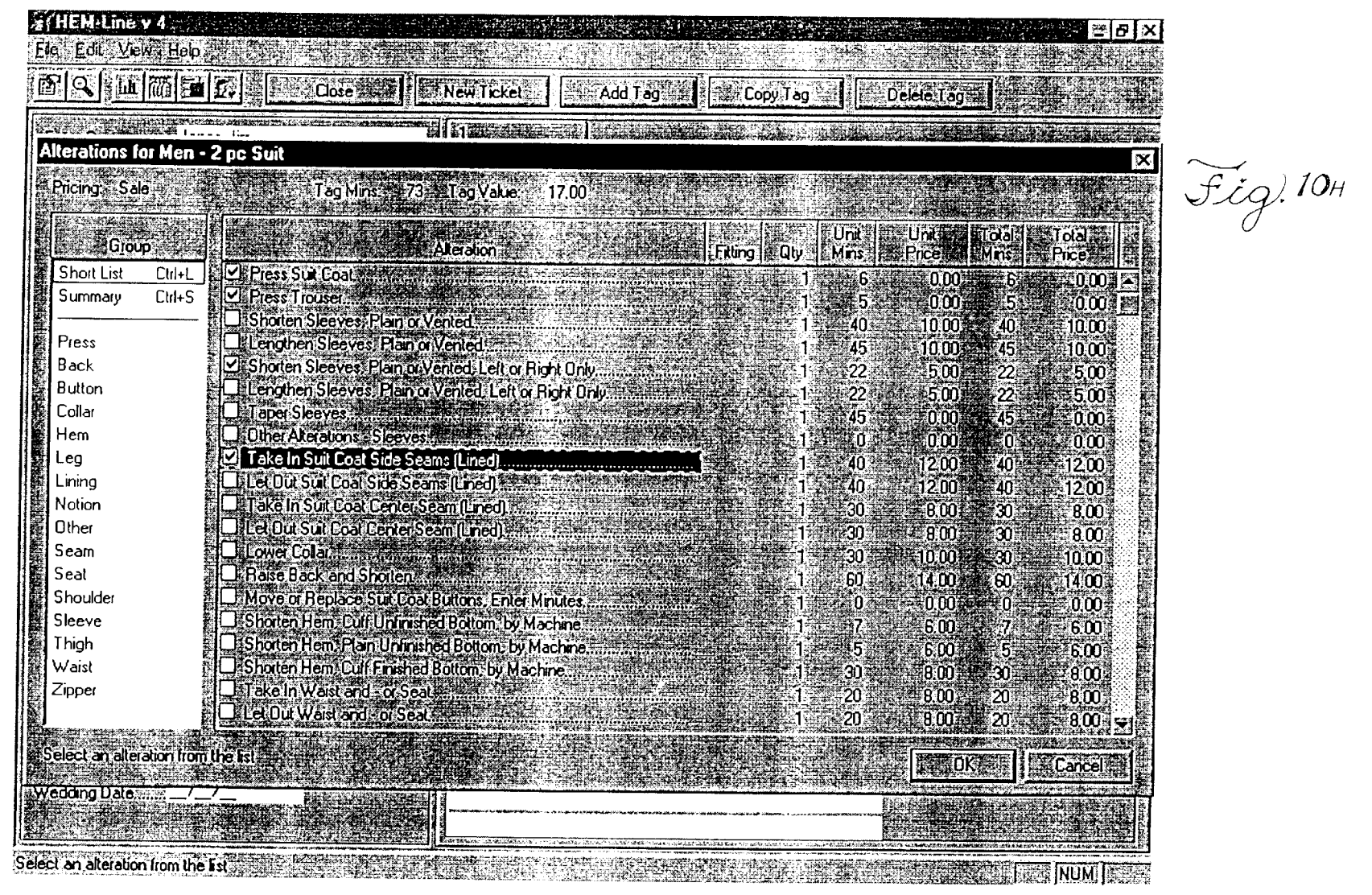

FIG. 10D depicts a screen interface that prompts the user for garment data. Upon entering the appropriate data, the user selects the "Alterations" selector as shown at step 166. The alterations screen interface (FIG. 10E) is displayed to allow a user to select alterations. The alterations screen interface in FIG. 10E organizes alterations in groups 196a. The user can select a particular group 196b to display the alterations selectors 197 available for that group 196b. A short list selector 198 limits the display of alterations selectors 197 to the most common for the selected garment. The summary selector 199 limits the display of alterations selectors 197 to the ones that the user has already chosen. As each alteration is selected, pricing and standard unit minute data is retrieved for the selected alteration as shown at step 168.

The user determines if additional garments are part of the alteration ticket. If there are additional garments, the user selects the New Tag selector and the decision block 170 returns to prompt for garment data at step 164. If no other garments are to be altered, the total value of alterations for the alterations ticket is displayed in the alterations screen of FIG. 10E. The ticket is then created at step 174 and the entry is illustrated in the ticket list 102 along with the total value of alteration in column 130 when control returns to the ticket list at step 192.

One feature in the electronic alterations ticket terminal 40 allows the process to run essentially in reverse. The reverse process 194 is provided on the electronic alterations ticket terminal 40 starting at step 176 to allow a sales associate to enter garment and alterations data while the customer is trying on the garment at a time that is very close to when the customer decides to purchase it. Garment sales typically proceed by having a customer try the garment on. While trying it on, the customer decides to buy it. Because fitters, or sales associates typically start the fitting process immediately, before asking for customer data or before generating ticket and sales data, the next step is step 164 which is the step of entering garment data. The rest of the process can be followed along the reverse process 194.

A customer may be dissatisfied with the alterations performed for a variety of reasons necessitating a re-alteration. Changes in circumstances (i.e. weight gain or loss) may also necessitate a re-alteration. Re-alterations are only enabled if a garment has been released. The Re-alterations selector 111 is only present when the alterations ticket selector 54 highlighted includes a tag for a garment that has been released or picked up.

When the user selects the re-alteration selector 111 at step 150, a copy is made of the presently selected alteration ticket (on the tickets list display 102 in FIG. 6) at step 180. The screen for processing a re-alteration is displayed at step 180. The screen, illustrated in FIG. 10F, allows the user to select which garment on the alteration ticket should be re-altered as shown at step 184. The user then creates a re-alteration ticket at step 186 by selecting the Create selector in FIG. 10F.

The steps that follow in processing a re-alteration are similar to the steps taken in creating an alteration ticket. Line 187 illustrates the path taken by the re-alteration process. Once the re-alteration ticket is created, the system prompts the user for garment data at step 164. The user is then prompted for alterations data 166. As alterations data is entered, the pricing and standard unit minute data for each selected alteration is retrieved at step 168. Re-alterations tend to focus on single garments making it unnecessary to determine if multiple garments are at being processed. The re-alterations ticket is stored at step 170. Control then returns to the ticket list 102 at step 192.

The interactive process of creating electronic alterations tickets illustrated by the flow chart in FIG. 9 involves execution of software steps that make the alteration tickets useful. The steps may include the sequence of steps in Table 1. One of ordinary skill in the art can apprehend the variety of ways in which the steps may be carried out to accommodate the workflow resulting from the display interfaces. Different implementations are possible depending on the graphical user interface system used, the programming language used and other system implementation factors.

TABLE 1

Create New Ticket Function

| | |
|---|---|
| Start: | Create New Ticket Data Base Record |
| | Process Customer Data Display |
| | Save Customer Data in Temporary Ticket Structure |
| | Process Ticket and Sales Data Display |
| | Save Ticket and Sales Data in Temporary Ticket Structure |
| A: | Process Garment Data Display |
| | Create Garment Tag Data Base Record |
| | Store Garment Data in Temporary Tag Structure |
| | Process Alterations Data Display |
| | Store Alterations Data in Temporary Tag Structure |
| | If New Tag, go to A |
| | Save Customer Data in Customer Elements of New Ticket Record |
| | Save Ticket and Sales Data in Ticket and Sales Elements |
| | Save Garment Tag in Tag Elements |
| | If Multiple Tags, Append Garment Tags |
| | Go to Workroom Workload Display |

The ticket list display interface 102 includes a modify selector 113 and a ticket properties selector 120, both of which may be used to modify an alteration ticket. A customer may need additional alterations performed on a garment. It is not uncommon for the need for certain alterations to become apparent only after other alterations have been performed. In such cases, the user does not create an alteration ticket, but rather modifies an existing one. The modification updates the data on the alteration ticket to indicate an added fitting and added alterations. The alteration ticket remains on the ticket list 102 with the status of the tag modified to indicate that work remains to be performed on is the garment. The fact that another fitting and more alterations were added is reflected in the alteration ticket data structure.

The advantage of the modification capability is that the extra work is actually recorded and accounted for in the performance and quality ratings. Prior art systems typically read paper tickets that may not indicate that a second or third fitting was involved. Without such a reference, the performance analysis systems may not account for the extra work leading to erroneous quality ratings.

IX. Garment Transfers

A preferred system of managing garment alterations workrooms includes a method for managing garment transfers. Garment transfers may be useful in a variety of situations. The most common is likely the situation in which a workroom has taken on too much work to be able to meet promise dates. By transferring the garments to other workrooms, the promise dates can be et. Garment transfers may come about by strategy if a central workroom is chosen for certain alterations, or all alterations. Alterations may also be outsourced to tailor shops. The garment transfer step may be a tool to ease work pressure, or it may be the main program used by a retailer if all alterations are outsourced. In the latter case, the garment transfer module is a convenient tool for facilitating and keeping track of garment transfers.

Figure 11:
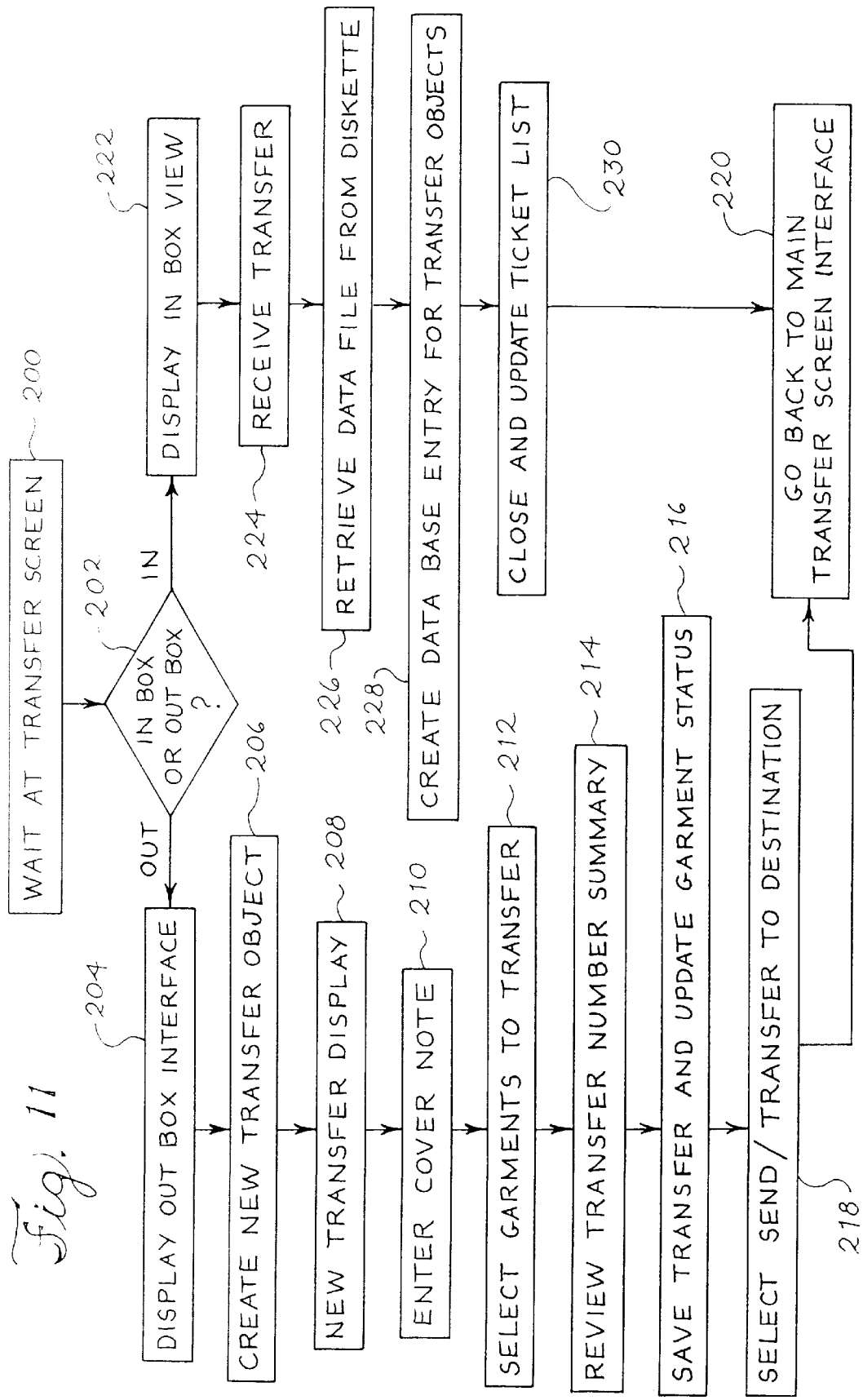
FIG. 11 is a flow chart illustrating a garment transfer process of the present invention.
Figure 12A:
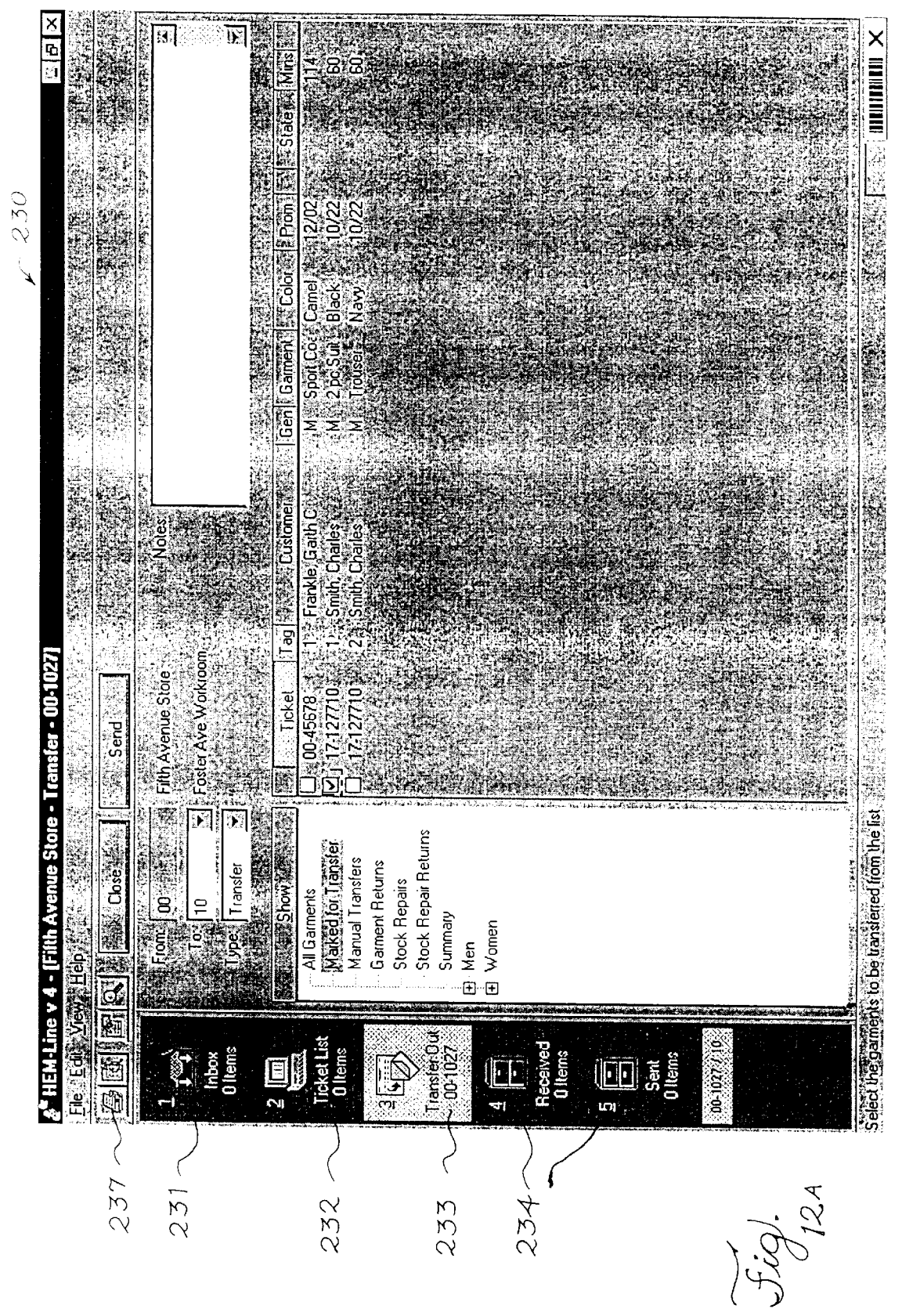
Figure 12:
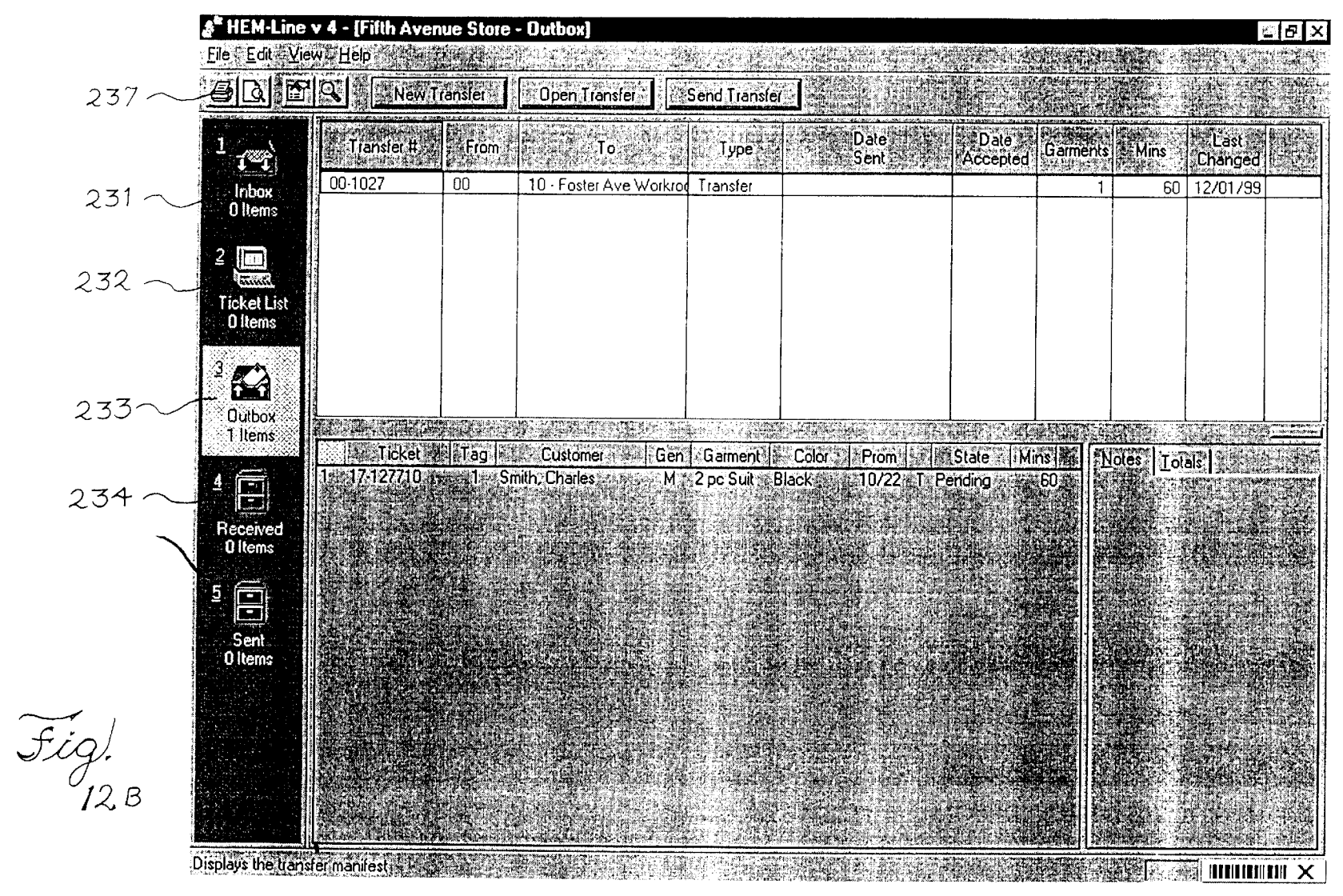

FIG. 11 is a flow chart of an example of a system for processing garment transfers. Step 200 may be performed at a display interface similar to the garment transfer display interface in FIGS. 12A and 12B The garment transfer display interface 230 includes a view selector 231, a tickets list view selector 232, an outbox view selector 233, a history views selector 234, check boxes 236 to mark garments for transfer and a print manifest selector 237.

At decision block 202, the user has either selected the inbox view selector 231 or the outbox view selector 233. If the user has selected the outbox view selector 233, a screen prompting for garment transfer information is displayed at step 204. The system creates a new transfer object at step 206. The user then defines parameters for the garment transfer in the new transfer display (not shown) at step 208. The display includes provisions for including a cover note at step 210, selecting garments for transfer at step 212 and reviewing the transfer at step 214. The transfer is saved at step 216 and the appropriate notations are made in the data base (most importantly that the transferred alterations tickets in the ticket list are marked as transferred).

The garment transfer is finalized by sending the garment transfer at step 218. The transfer may be sent electronically over a network with the garments to follow. In another embodiment, the transfer is installed on a floppy disk that is to be physically attached to the garments. Once the transfer is prepared for sending, control returns to the main transfer interface at step 220. Once a transfer has been prepared by selecting garments to transfer, the manifest may be printed by selecting the print manifest selector 237.

If at decision block 202, the user selected the inbox view selector 231, the inbox view is displayed according to step 222 and the user proceeds to receive the transfer at step 224. When prompted, the user inserts the floppy disk in the drive to retrieve the data from the disk as shown at step 226. Alternatively, the user may navigate the system to locate data electronically transmitted via a network. At step 228, database entries are created for the transferred objects. At step 230, the ticket list data base is updated and control returns to the main transfer screen at step 220.

X. Updating the Status of Alterations Tickets

Figure 13:
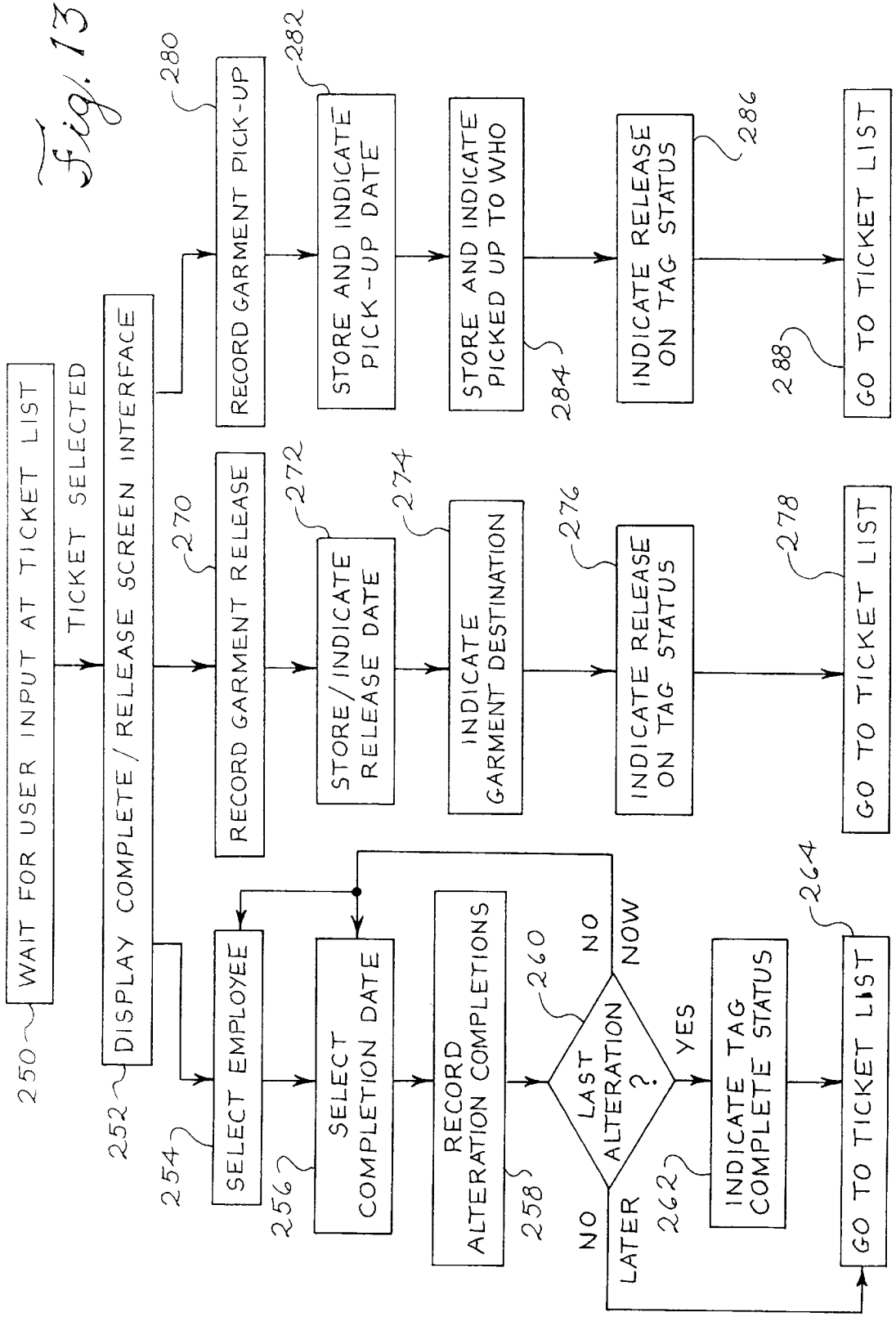
FIG. 13 is a flow chart illustrating the alteration status update process of the present invention.

FIG. 13 is a flow chart for a process for updating the status of alterations tickets. In general, the change in status of an alterations ticket involves the recording of the fact that an action, activity (e.g. an alteration) has occurred, the time of occurrence and the person responsible. Once alterations tickets are created, the state of the tickets are tracked in the data base records in which the tickets are stored. The state of each ticket is reflected in the various display interfaces such as the ticket list 102. As each change in status is discussed below, the software steps that implement the change involve steps that access the relevant data base record elements. The changes are retrieved from the entry made by a user in a text box, or a check box in the display interfaces in FIG. 14.

Figure 14A:
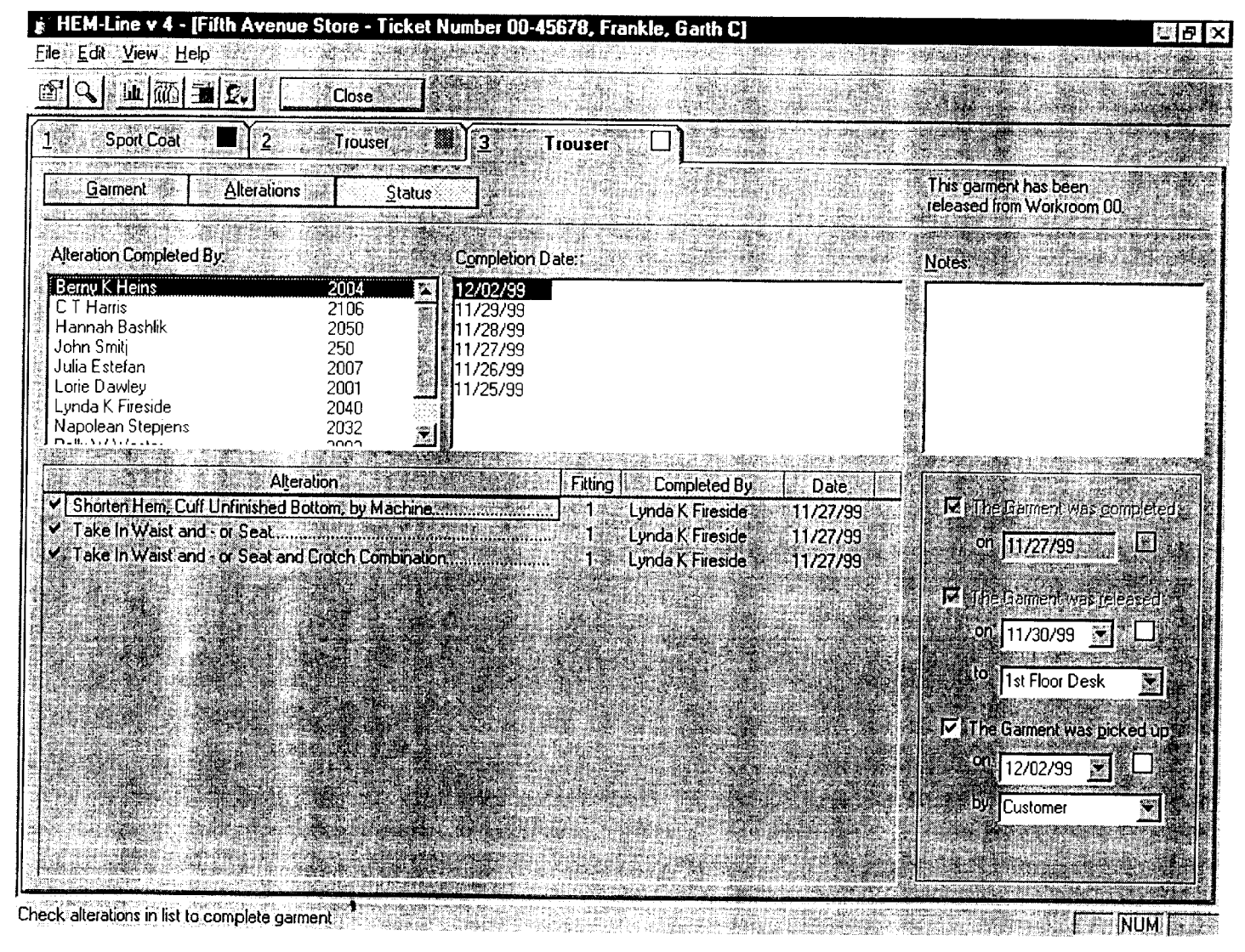
Figure 14B:
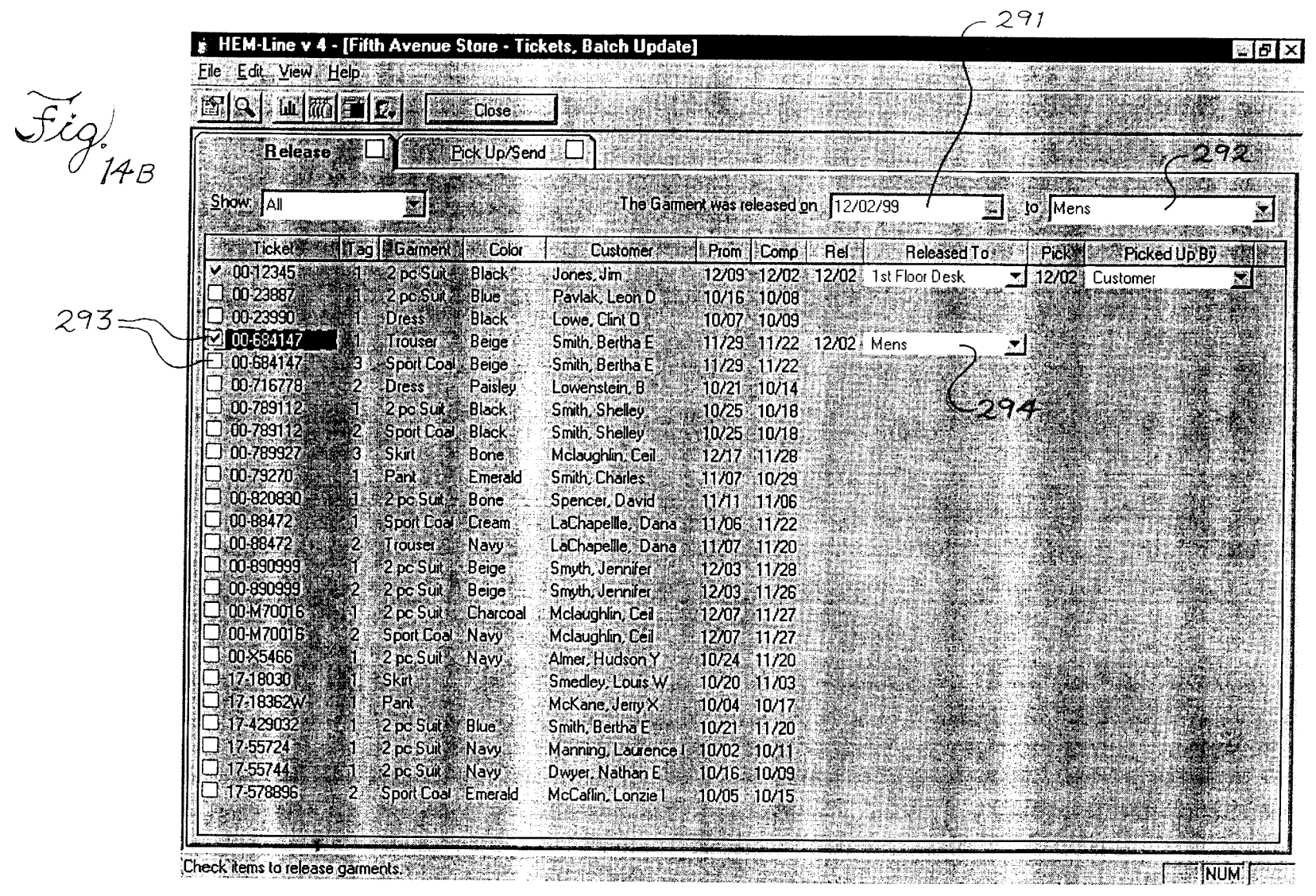

At step 250, the process of updating the status of an alteration ticket begins at the ticket list 102. The user selects a ticket causing the screen for recording the completion or the release of an alteration ticket to be displayed at step 252. The screen is illustrated in FIG. 14A.

If the user is recording an alteration, control proceeds to step 254 to allow the user to select the name of the employee that performed the alteration. The date of completion is then selected at step 256. At step 258, the user selects the alterations performed by the selected employee on the selected date from a list of alterations requested. Decision block 260 then determines if any more alterations remain to be performed. If no alterations remain to be performed, the tag is identified as completed at step 262 which causes the icon 122 (FIG. 6) to change according to the legend 137 (FIG. 6). The garment identified with the tag is now ready to be released.

If at decision block 260, more alterations that have not been performed remain on the tag, control returns to the ticket list at step 264. If some alterations remain to be completed, the user returns to either step 254 to select other employees, or to step 256 to select a different completion date. The ticket list 102 is automatically updated to reflect the current status of the ticket.

If the user has inspected the garment and wishes to record a garment release at step 270, the user indicates the release date at step 272. At step 274, the user then releases the garment to a destination, such as the sales department where the garment was sold, or to a central will call department. At step 276, the icon 122 (FIG. 6) is changed to indicate the garment is released. Control returns to the ticket list at step 278. The ticket list 102 is automatically updated to reflect the current status of the ticket.

If the customer has picked-up the garment, or if it was delivered to the customer per instructions, the pickup is recorded at step 280. The pick-up date is indicated at step 282. Whether the customer picked-up, or the garment was delivered is indicated at step 284. Icon 122 (FIG. 6) is changed to indicate the garment was picked-up at step 286. Control returns to the ticket list at step 288. The ticket list 102 is automatically updated to reflect the current status of the ticket.

The steps of recording a release or a pickup/send may be carried out as a batch process. A display interface such as the batch release display interface in FIG. 14B may be presented to the user to enable the release of garments in a batch. The display interface in FIG. 14B may be invoked using a selector or a menu item in the ticket list 102. A list of alterations tickets that is filtered according to garments that are ready for release is provided in the display in FIG. 14B. The user selects the release date 291, a destination 292 and one or more garments for release using the check boxes 293. Release information, such as the department or person to whom the garment was released, may be changed using a drop list 294. A display interface for recording a pickup or a delivery by batch operates in a manner similar to the display in FIG. 14B.

XI. Voice Response to Customer Inquiry

Figure 15:
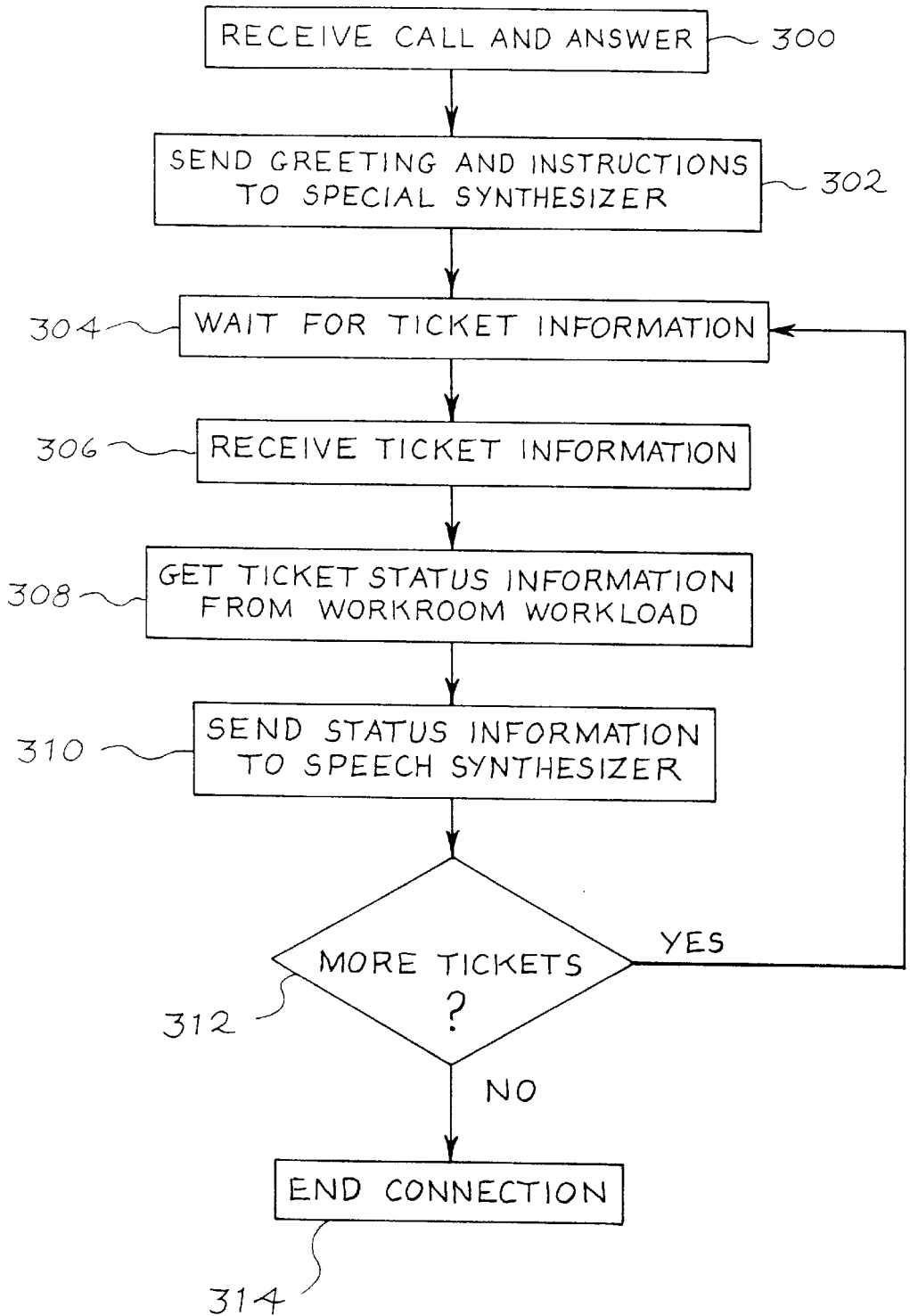
FIG. 15 is a flow chart illustrating the integrated voice response process of the present invention.

FIG. 15 is a flow chart for a system that provides a voice response to a customer inquiry into the status of a garment alteration. A customer may place a phone call to the garment alteration management system. The system connects to the call at step 300. The system then transmits, through the speech synthesizer system 37 of the workroom processor 30, a greeting message that includes instructions for obtaining a garment alteration status at step 302. One instruction may be to request a ticket number, or other item of information indicative of the garment alteration request. The customer may enter the ticket number using the telephone keypad. The system waits for the user to enter the ticket information at 304. The garment alteration inquiry system receives the information at step 306.

When enough information to identify an alteration ticket is received, the inquiry system gets the alteration ticket from the ticket list 102 at step 308. The inquiry system then transmits the status information to the user through the speech synthesizer 37 at step 310. The status information may include whether the alteration is pending, complete or released. The status information may also include the promise date along with an indication of whether the promise date will be met.

The inquiry system then queries the user for an indication of whether there are any additional tickets at step 312. If there are more tickets, the system returns to step 304. If there are no more tickets, the system transmits a final message before ending the connection at step 314.

XII. Garment Alterations Forecasting

The forecasting tool in a preferred embodiment provides the user with information relating to the workload of the workroom against the scheduled labor resources. The forecasting tool bases the information on garment and alterations data retrieved from the alteration ticket data structures stored as shown by the ticket list 102, and on labor data retrieved from the employee module 66.

Figure 16:
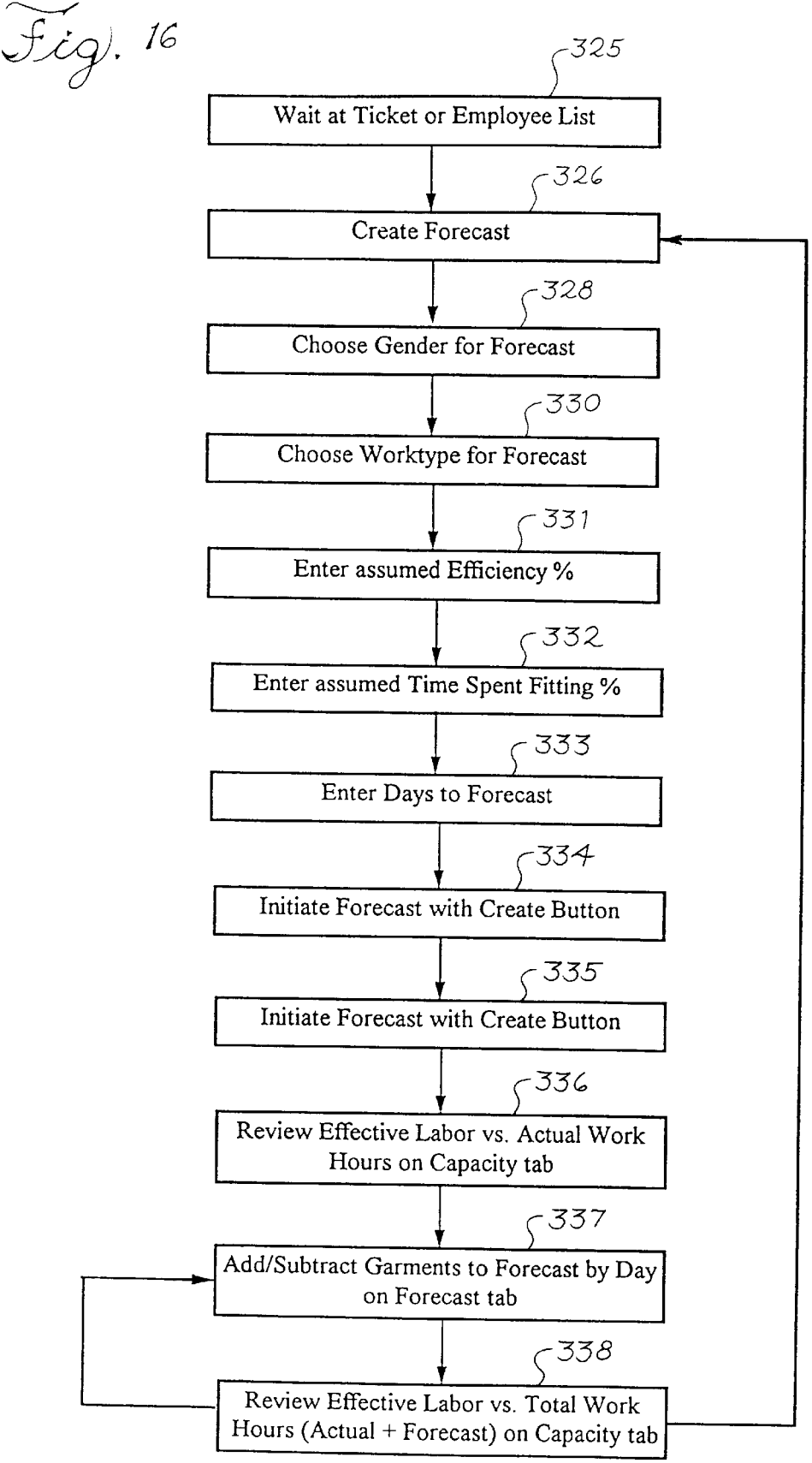
FIG. 16 is a flow chart illustrating the process of configuring and generating a workroom forecast.

FIG. 16 is a flow chart for a method of displaying a forecast of the workroom workload against available labor. The forecast function is invoked at step 325 when the user selects the forecast selector 109 (in FIG. 6).

Figure 17A:
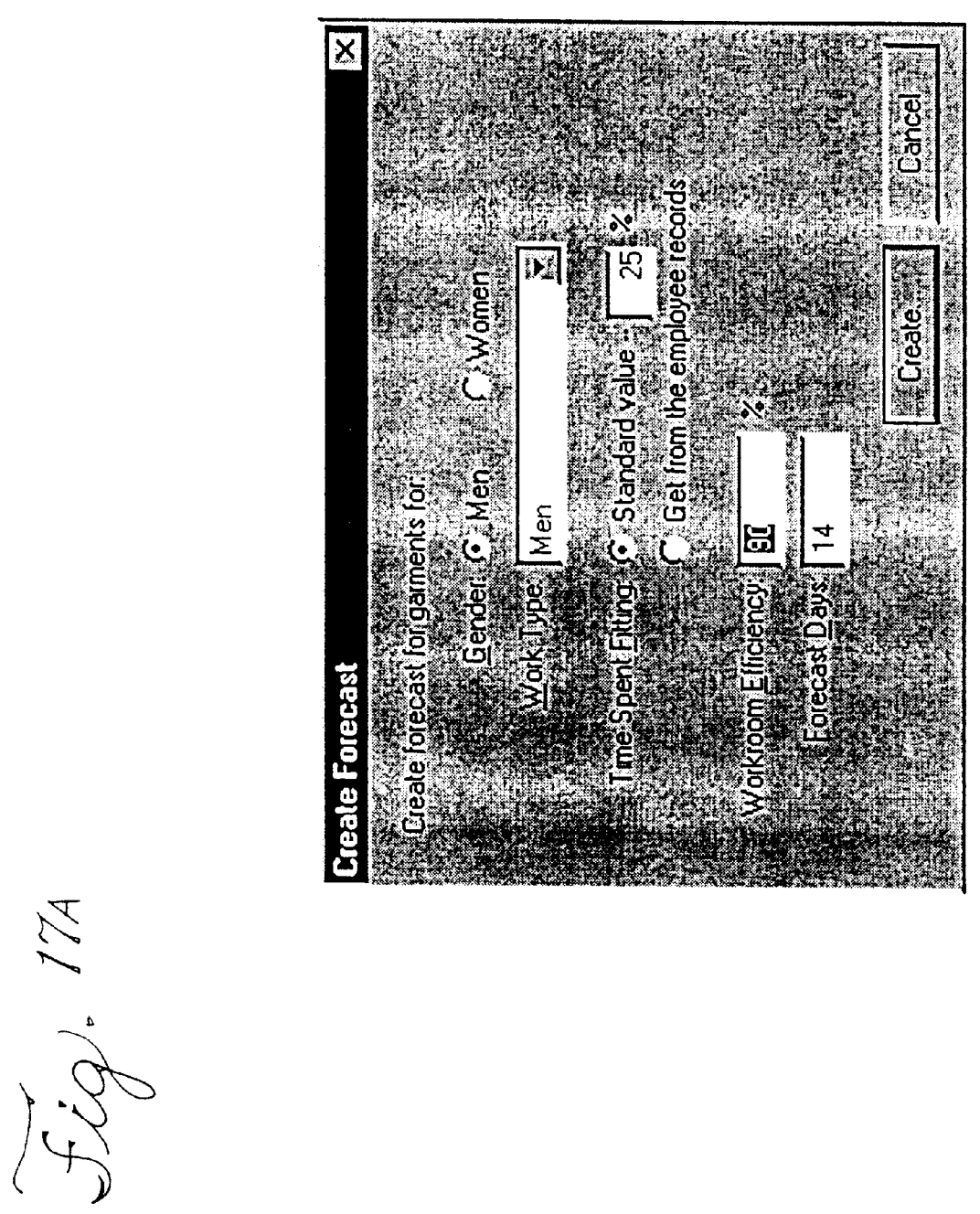

At step 326, an interface (illustrated in FIG. 17A) for creating a forecast is displayed on the screen. The purpose of the interface in FIG. 17A is to allow the user to configure, the forecast according to the user's specific needs. At step 328, the user chooses a gender for the forecast. At step 330, the user chooses a worktype for the forecast at step 331, the user enters a percentage relating to an assumed efficiency. At step 332, the user enters the percentage of the worker's time spent that the user assumes is spent fitting. At step 333, the user enters the number of days for which a forecast is desired.

At step 334, the user has entered the information used to provide a forecast and selects the create button to view the forecast. At step 336, the user reviews the results on a capacity screen 340 (shown in FIG. 17B). The capacity screen 340 displays the effective labor against actual work hours for the number of days selected on the create forecast screen in FIG. 17A starting with the current date. The 'T' column indicates the number of sewers available each day. The 'F' column indicates the number of fitters available each day. The 'total hours' column indicates the number of hours scheduled for the sewers. The 'Eff. Hrs.' column factors efficiency and time spent fitting into the number of hours scheduled for the sewers.

The 'Hours Work' column indicates the amount of actual work in the workroom (from previously entered garments) up to a maximum of the 'Effective Hours' for that day. The total remaining workload is similarly allocated against each subsequent day in the forecast until no more work remains. The 'Forecast' column indicates the number of hours of work expected to be received on a given day. The garment alteration system in a preferred embodiment includes a history of all alterations work performed. The history can be used to predict the number of new garments that the workroom will have on a given day. The number, which may be restricted to garments of a specific gender is displayed in the 'Forecast' column. The 'Total Hours' column displays the sum of the actual hours of work and the forecasted hours of work. The 'Open hours' column displays the difference between the effective hours and the total hours. The '%' column provides the total hours of work as a percentage of the effective hours.

At step 337, the user can display the Forecast screen by selecting the Forecast tab selector 342 illustrated in FIG. 17C. From the screen in FIG. 17B, the user can review the effective labor against the actual work in terms of the specific garments forecasted to be altered from the entries made on the Forecast tab illustrated in FIG. 17C. In the screen 341 in FIG. 17C, the dates are displayed in the columns.

The user may alternate between the screens by selecting the selector tabs 343 illustrated on both screens.

One of ordinary skill in the art can envision extensions to the screens without departing from the scope of the invention. For example, a tab may be added to display the information provided in FIGS. 17B and 17C in the form of charts or graphs. Other embodiments and variations may be similarly envisioned.

XIII. Reports Module

Preferred methods for creating and tracking alterations tickets have been described with reference to FIGS. 6–15. Although an alterations workroom benefits from the added simplicity of day-to-day work management, a further advantage is gained by having management information and workroom monitoring data available in real-time. By adding a reports module 80, a workroom manager may obtain workroom data to aid in the making of strategic decisions. The reports module 80 provides reports to aid in labor management, garment tracking, performance management, workroom tools and a variety of other analyses.

Figure 18:
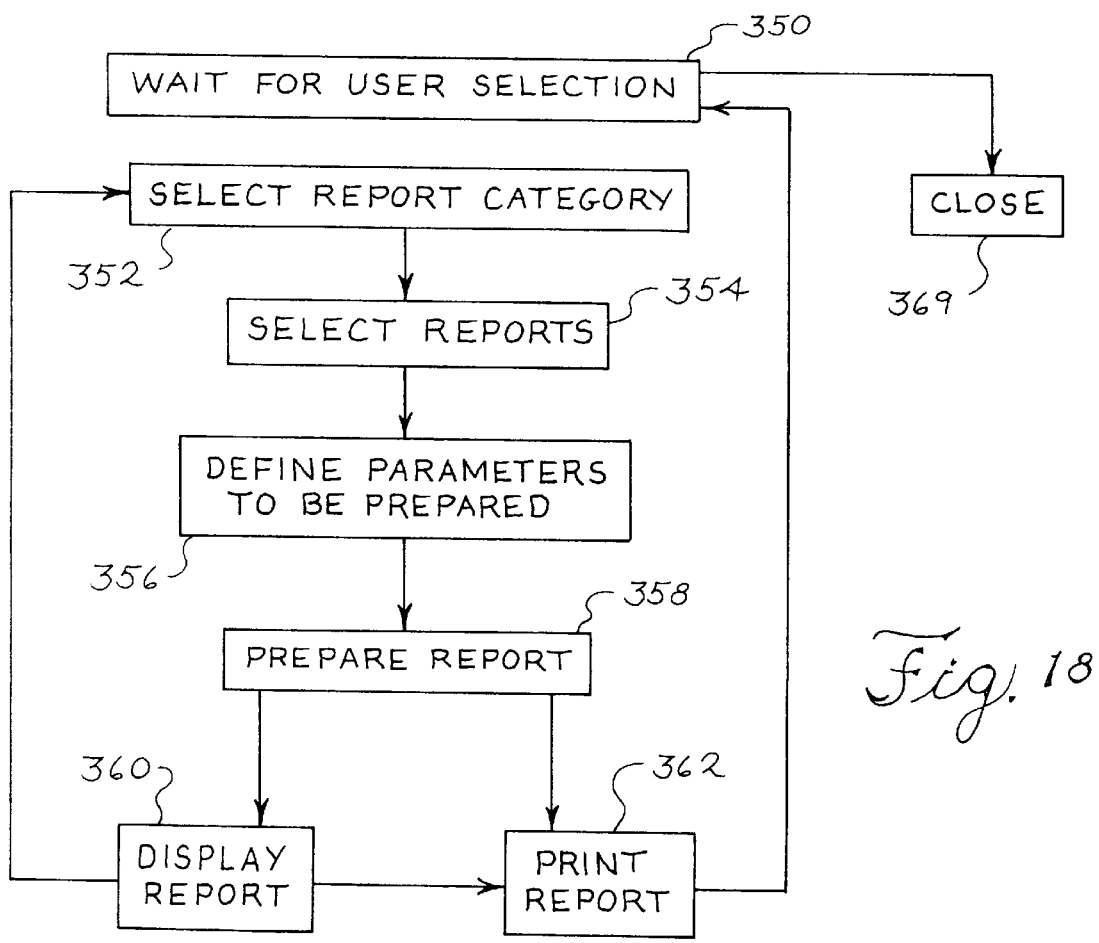
FIG. 18 is a flow chart illustrating the reports generating process of the present invention.

FIG. 18 is a flow chart for a report generator in a preferred alteration management system. When invoked, a reports display interface 410 (shown in FIG. 19A) is displayed to receive the user's report choice. The reports are provide in two categories in a view that resembles a hierarchical tree structure. The first category is corporate reports 400 and the second is workroom reports 402. The user may select a report and get a description of the report by selecting the "Description" tab in FIG. 19A. The screen illustrated in FIG. 19B is displayed showing a description of the report selected at 404.

In general the workroom reports aid the workroom manager in making decisions relating to the managing the workroom. The corporate reports are typically used on a workroom processor operating in a central computer 11 (FIG. 1). The alterations ticket data may be uploaded to the central computer 11 having the reports module.

Figure 19A:
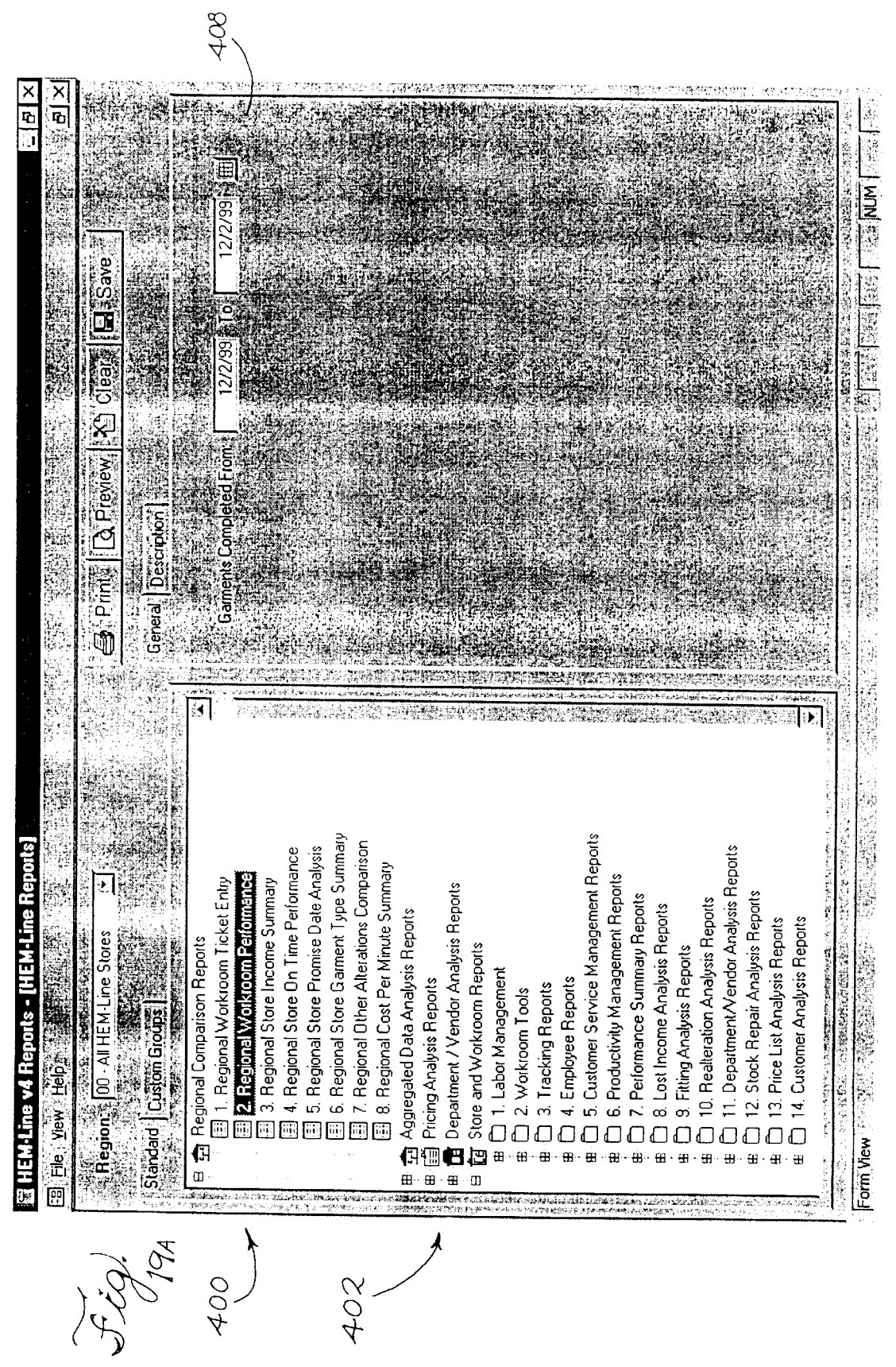
Figure 19B:
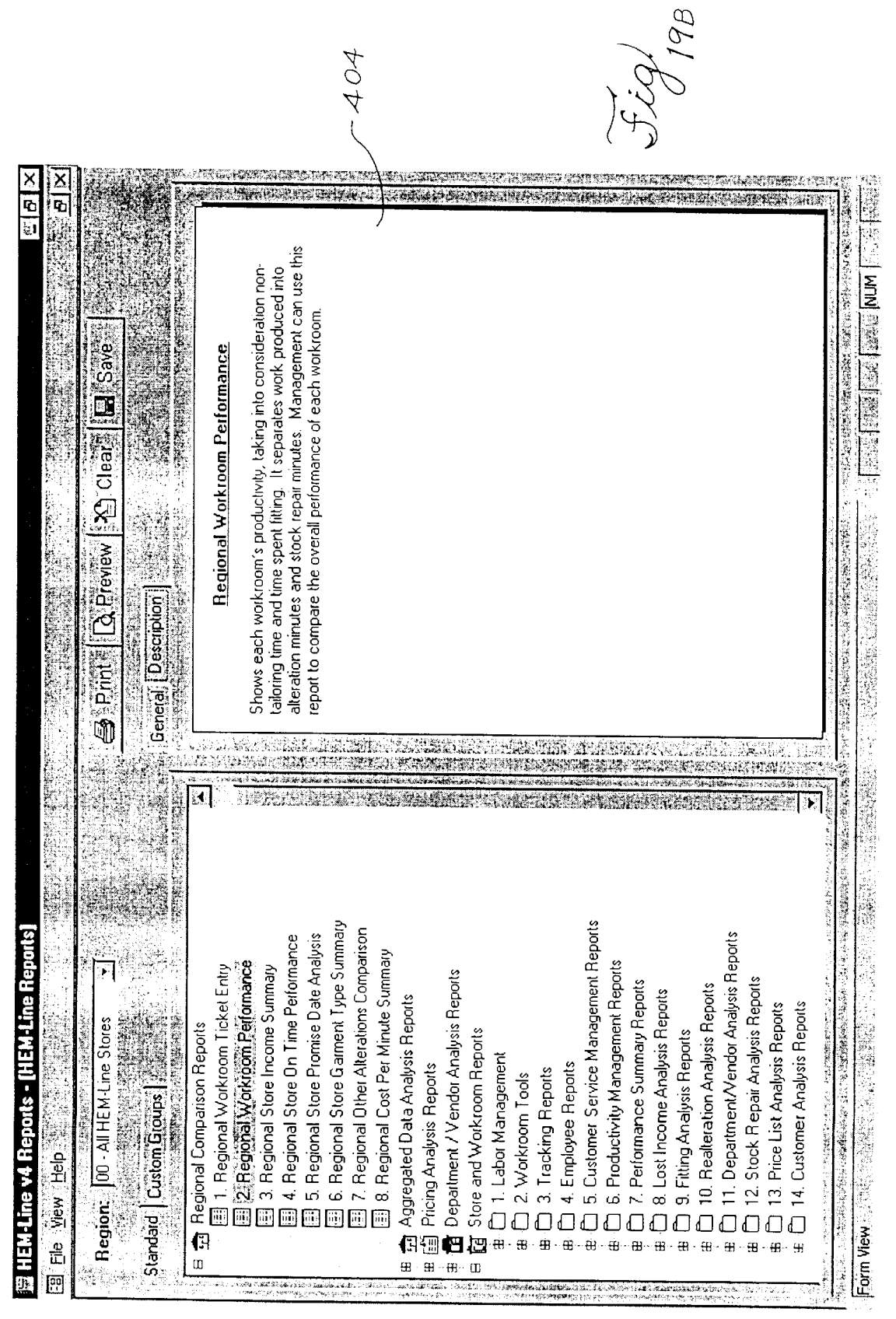
Figure 19C:
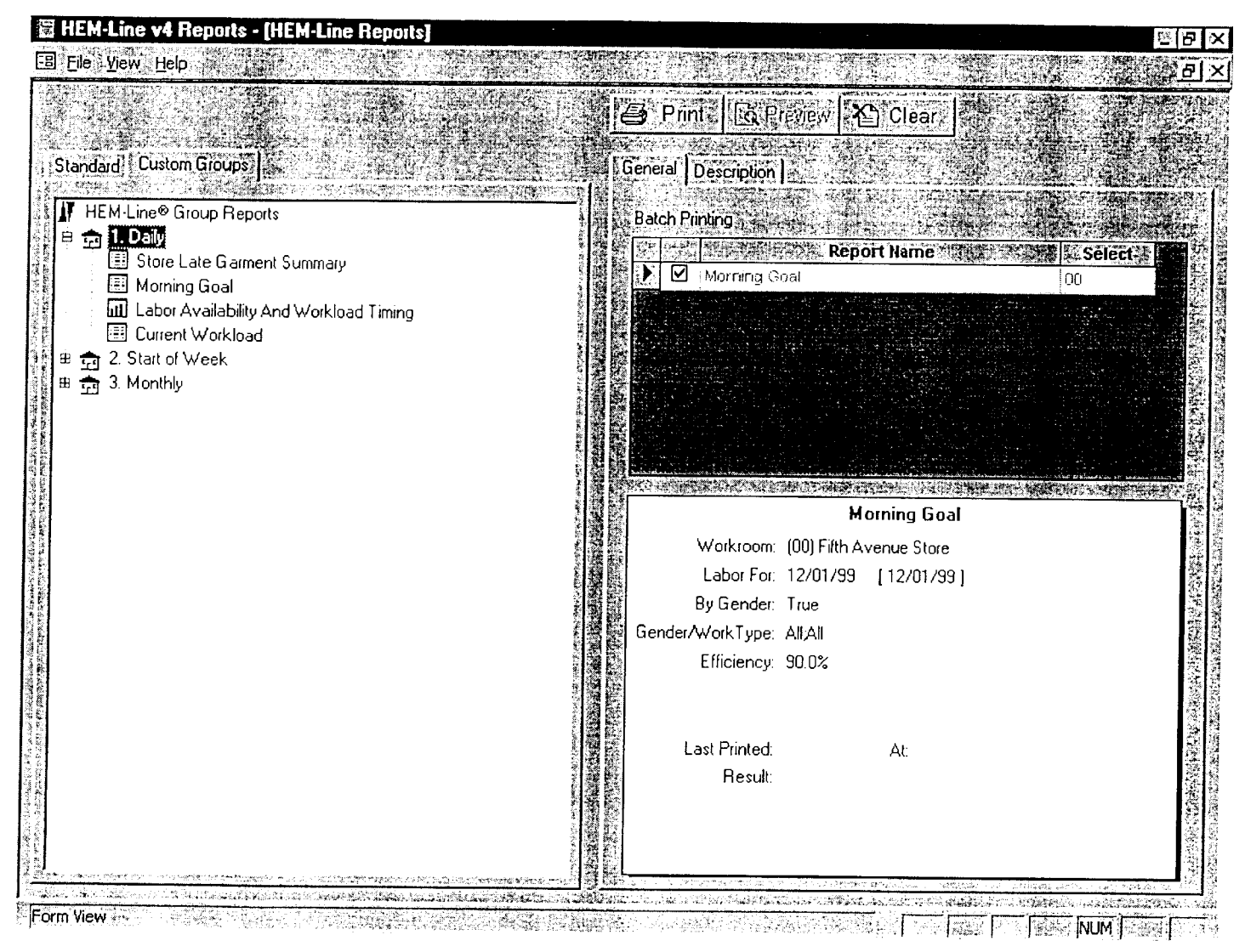

In order to retrieve a report, the user returns to the screen in FIG. 19A to highlight the Print button. The user selects a report category at step 352 in FIG. 18. The user then selects a report at step 354. The user then defines parameters to be prepared for the specific report chosen at step 356. These parameters are illustrated at 408 in FIG. 19A.

The user then prepares a report at step 358 in one of two ways. The user may obtain a displayed preview at step 360 from which a printout may be retrieved at step 362. Alternatively, the user may select Print in FIG. 19A to obtain a printout at step 362.

Figure 20:
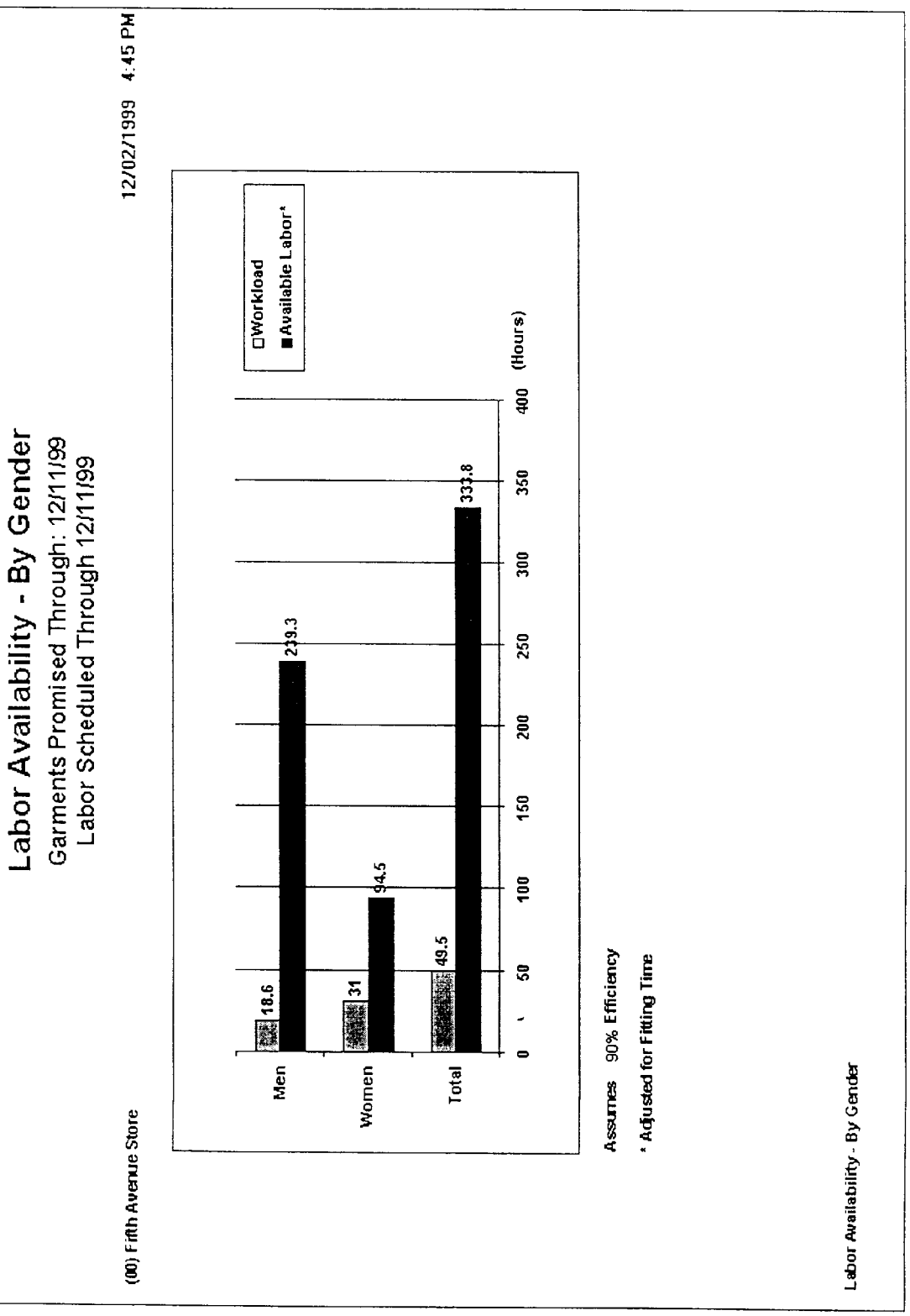
FIG. 20 is an example of a report provided by the report generator.

A sample labor availability report is illustrated in FIG. 20. Other workroom reports available to the user are provided in Table 2.

As can be seen, the system described in the foregoing detailed description provides garment alterations workroom managers the ability to create and store alteration tickets. The alteration tickets can thus be used to generate management information that is useful in making strategic decisions relating to labor management, garment tracking, quality, recovery of income, recovery of costs and pricing. These advantages are enhanced because the garment alteration data is stored in an alteration ticket data structure that relates to the alterations workroom workflow making access for reports and summaries easy and meaningful. These advantages are further enhanced because the system provides display interfaces for invoking functions relating to the creation of alterations tickets and the updating of the status of the work associated with the tickets.

These advantages are further enhanced because an electronic garment alteration ticket terminal is provided to allow a sales associate or a fitter to obtain alterations data on the sales floor. The garment alteration ticket terminal provides a workflow that tracks the manner in which data is actually obtained. The workflow minimizes the burden of data entry and the amount of training required.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the appended claims, including equivalents, that are intended to define the spirit and scope of this invention.

TABLE 2

| Category | Report |
| --- | --- |
| Labor Management | Labor Forecast |
| | Workload Timing |
| | Labor Availability |
| | Individual Workload |
| Workroom Tools | Morning Goal |
| | Current Workload |
| | Cumulative Workload |
| Tracking Reports | Garment Status Report |
| | Late Garment Summary |
| | Garment Sign-Out List |
| | Garment Pick Up List |
| | Customer Call-By Dept./Sales Assoc. |
| Employee Reports | Employee Schedule |
| | Employee Time Surnmary |
| | Employee Work Type |
| Performance Reports | Monthly Snapshot |
| | Weekly Summary |
| | Garment Profit and Loss |
| | Garment Type Summary |
| | On-Time Performance |
| | Workroom Performance |
| Lost Income Report | Waiving Authorization Summary |
| | Waived Tickets Detail |
| | Pricing Discrepancies |
| Fitting Reports | Fitting Summary |
| | Fitting Comparisons |
| | Daily Fitting Counts |
| | Fittings-By Department |
| Re-alteration Reports | Re-alteration Summary - By fitter |
| | Re-alteration Summary - By Sewer |
| | Re-alteration Detail |
| Dept./Vendor Analysis | Department Profit and Loss |
| | Vendor Profit and Loss |
| | Vendor Comparison |
| Stock Repair Reports | Stock Repair Summary |
| Price List Reports | Other Alteration Summary |
| | Corporate Price List |
| Charts | Garment and Task Counts |
| | Scheduled Labor vs. Workload Hours |
| | Alteration Value vs. Amount Collected |
| | On-Time Performance |
| | Alteration Value vs. Alteration Cost |
| Customer Analysis | Customer Summary |
| Reports | Mailing Lists |

We claim:

1. A system for managing the alteration of existing standard garments comprising:

a workroom processor comprising an input, a data storage and a display;

an alteration ticket data structure stored in the data storage, the alteration ticket data structure defining a sales receipt data field, a ticket data field, a garment data field, a fitting data field and an alterations data field;

means coupled to the input for prompting a user for garment data, alteration data, sales receipt data, fitting data and ticket data for a standard garment, and for storing said data in corresponding fields as an entry in the alteration ticket data structure, the alteration data representative of alterations to be made to the standard garment;

means coupled to the data storage for generating an alteration ticket corresponding to the entry in the alteration ticket data structure, the entry comprising the sales receipt data, the ticket data, the garment data, the fitting data and the alteration data;

means coupled to the display for presenting the entry on the display; and means coupled to the input for prompting the user to update garment data and alteration data of the entry, and for automatically presenting the updated garment and alteration data on the display.

2. The system of claim 1 further comprising:

an alteration price list data structure stored in the data storage, the alteration price list data structure defining a gender data field, a work type data field, a garment type data field, a group data field, an alteration data field, an item data field, a price data field, a standard unit data field, and a price type data field.

3. The system of claim 1 further comprising:

a plurality of entries; and means coupled to the display for generating a ticket list comprising the entries.

4. The system of claim 1 wherein the alteration ticket data structure further comprises a customer data structure.

5. The system of claim 1 wherein the ticket data structure further defines a ticket promised alteration date based on an earliest garment promised completion date.

6. The system of claim 1 wherein the garment data field further defines an alterations data structure further comprising means coupled to the display for presenting the updated status of the entry as a coded icon.

7. The system of claim 1 further comprising means for periodically receiving electronic alteration tickets via a communication interface connected to a garment alteration ticket terminal, the garment alteration tickets being associated with one or more standard garments to be altered, the garment alteration ticket terminal comprising:

a memory, an input and a display;

an alteration ticket data structure stored in the data storage, the alteration ticket data structure defining a sales receipt data field, a ticket data field, a garment data field, a fitting data field and an alterations data field;

means coupled to the input for prompting a user for garment alteration data and for storing the garment alteration data in the alteration ticket data structure, the garment alteration data representing alterations to be made to the one or more standard garments to be altered;

means coupled to the input for prompting a user for data relating to the request and for storing the data in the alteration ticket data structure;

means coupled to the memory for generating an electronic alteration ticket corresponding to an entry in the alteration ticket data structure, the entry including the ticket data, garment data and alterations data for a garment.

8. The system of claim 7 wherein the communication interface comprises an infrared link.

9. The system of claim 7 wherein the communication interface comprises a radio frequency link.

10. The system of claim 7 wherein the communication interface comprises a cable link.

11. The system of claim 1 further comprising:

a voice response unit coupled to a telephone link to allow a customer to obtain a status report on a garment over the telephone link.

12. The system of claim 1 further comprising:

a reports module coupled to the alteration ticket data structures operative to generate workroom management reports.

13. The system of claim 1 further comprising:

network means for connecting one or more workroom processors, the network means allowing for sharing of alterations tickets among the one or more workroom processors.

14. The system of claim 1 further comprising:

a central computer operative to receive workroom data from more than one workroom processor; and a central reports module operative to generate comparative workroom reports.

15. A garment alteration ticket terminal for entry of information related to alteration of existing standard garments to conform to customer requirements, the garment alteration ticket terminal comprising:

a memory, an input and a display; an alteration ticket data structure stored in the data storage, the alteration ticket data structure being associated with a standard garment to be altered and defining a sales receipt data field, a ticket data field, a garment data field, a fitting data field and an alterations data field;

means coupled to the input for prompting a user for garment data, alteration data, sales receipt data, fitting data and ticket data for the standard garment to be altered, and for storing said data in corresponding fields as an entry in the alteration ticket data structure;

means coupled to the memory for generating an electronic alteration ticket corresponding to the entry in the alteration ticket data structure, the entry comprising the sales receipt data, the ticket data, the garment data, and the alteration data; and means for periodically communicating the electronic alteration tickets stored in the memory via a communications interface.

16. The garment alteration ticket terminal of claim 15 further comprising:

a plurality of entries; and means coupled to the display for generating a ticket list comprising the entries.

17. The garment alteration ticket terminal of claim 15 further comprising a pricing data base.

18. The garment alteration ticket terminal of claim 15 further comprising a customer data base.

19. The garment alteration ticket terminal of claim 15 wherein the input comprises a pen input.

20. The garment alteration ticket terminal of claim 19 wherein the pen input is coupled to an input facility comprising an on-screen keyboard.

21. The garment alteration ticket terminal of claim 19 wherein the pen input is coupled to an input facility comprising a drop-list.

22. The garment alteration ticket terminal of claim 19 wherein the pen input is coupled to an input facility comprising a handwriting recognition package.

23. The garment alteration ticket terminal of claim 15 wherein the input includes a keyboard.

24. The garment alteration ticket terminal of claim 15 wherein the input includes a microphone coupled to a voice recognition module.

25. The garment alteration ticket terminal of claim 15 further comprising a ticket printer.

26. A method for determining a source of uncollected alteration fees in garment alteration business, the method comprising:

for each alteration performed, determining a difference between a customer paid amount and an amount that should have been collected for the alteration performed and associating the difference with a respective sales associate and a respective fitter employed by the garment alteration business.

27. The method of claim 26 further comprising:

determining the customer paid amount from a sales receipt; and determining the amount that should have been collected from an alteration ticket.

28. A method for determining the cost for operating a garment alterations workroom, the method comprising:

determining hours of labor scheduled for a respective employee in the garment alterations workroom multiplied by the respective employee's cost per hour to produce a wage cost;

adjusting for overtime at an overtime rate to produce an overtime cost;

multiplying by an appropriate multiplier for employee benefits to produce a benefit cost; and summing the wage cost, the overtime cost and the benefit cost for each employee.

29. A method for allocating the cost of operating a garment alterations workroom across departments within a store, the method comprising:

determining total garments and repairs completed within each department;

determining the total minutes completed (alterations and repairs) within each department;

calculating percentage of completed garments by each department;

calculating percentage of completed minutes by each department; and allocating the cost of operating the garment alterations workroom according to at least one of the percentage of completed garments and the percentage of completed minutes.

* * * * *